United States Patent
Raag et al.

(10) Patent No.: US 11,693,424 B2
(45) Date of Patent: Jul. 4, 2023

(54) ROBOT, SYSTEM AND METHOD DETECTING AND/OR RESPONDING TO TRANSITIONS IN HEIGHT

(71) Applicant: STARSHIP TECHNOLOGIES OÜ, Tallinn (EE)

(72) Inventors: Rasmus Raag, Tallinn (EE); Sergii Kharagorgiiev, Tallinn (EE)

(73) Assignee: STARSHIP TECHNOLOGIES OÜ, Tallinn (EE)

( * ) Notice: Subject to any disclaimer, the term of this patent is extended or adjusted under 35 U.S.C. 154(b) by 846 days.

(21) Appl. No.: 16/439,595

(22) Filed: Jun. 12, 2019

(65) Prior Publication Data
US 2020/0159245 A1    May 21, 2020

Related U.S. Application Data

(63) Continuation of application No. PCT/EP2017/082267, filed on Dec. 11, 2017.

(30) Foreign Application Priority Data

Dec. 14, 2016   (EP) ...................................... 16204153
Dec. 11, 2017   (WO) .................. PCT/EP2017/082267

(51) Int. Cl.
*G05D 1/02*       (2020.01)
*G01C 5/00*       (2006.01)

(52) U.S. Cl.
CPC ............. *G05D 1/0251* (2013.01); *G01C 5/00* (2013.01); *G05D 2201/0213* (2013.01)

(58) Field of Classification Search
CPC . G05D 1/0251; G05D 2201/0213; G01C 5/00
See application file for complete search history.

(56) References Cited

U.S. PATENT DOCUMENTS 4,549,841 A    10/1985   Ishige
5,664,928 A    9/1997    Stauber
(Continued)

FOREIGN PATENT DOCUMENTS

WO    WO 2011035839    12/2018

OTHER PUBLICATIONS

CMU.edu, Linear Classifiers and the Perceptron Algorithm, 2009, CMU.edu, pp. 1-3 (Year: 2009).*

(Continued)

*Primary Examiner* — Aniss Chad
*Assistant Examiner* — Chase L Cooley
(74) *Attorney, Agent, or Firm* — Siritzky Law, PLLC

(57) ABSTRACT

The present invention relates to a method of a robot (30) responding to a transition (40) between height levels, the method comprising a robot (30) travelling, sensing information of the surroundings of the robot (30) and generating a three dimensional data set corresponding to a heightmap of the surroundings of the robot (30) based on the information, detecting a transition (40) between different height levels (10, 20) in the three dimensional data set, categorizing the transition (40) between the different height levels (10, 20) by means of at least one characteristic, the robot (30) performing a response action, which response action depends on the categorization of the transition (40). The present invention also relates to a corresponding system.

25 Claims, 10 Drawing Sheets

(56) References Cited

U.S. PATENT DOCUMENTS

| | | | |
|---|---|---|---|
| 5,942,869 | A | 8/1999 | Katou et al. |
| 6,467,293 | B1 | 10/2002 | Goosman |
| 6,602,037 | B2 | 8/2003 | Winkler |
| 7,073,634 | B2 | 7/2006 | Mitchell et al. |
| 7,320,289 | B1 | 1/2008 | Clarke et al. |
| 7,894,939 | B2 | 2/2011 | Zini et al. |
| 7,931,431 | B2 | 4/2011 | Benedict et al. |
| 8,010,230 | B2 | 8/2011 | Zini et al. |
| 8,104,601 | B2 | 1/2012 | Hayduchok et al. |
| 8,204,624 | B2 | 6/2012 | Zini et al. |
| 8,485,285 | B2 | 7/2013 | Ferrigni |
| 8,874,360 | B2 | 10/2014 | Klinger et al. |
| 8,948,914 | B2 | 2/2015 | Zini et al. |
| 9,020,632 | B2 | 4/2015 | Naylor |
| 9,031,692 | B2 | 5/2015 | Zhu |
| 9,244,147 | B1 | 1/2016 | Soundararajan et al. |
| 9,256,852 | B1 | 2/2016 | Myllymaki |
| 9,266,675 | B2 | 2/2016 | Yamashita |
| 9,373,149 | B2 | 6/2016 | Abhyanker |
| 9,557,740 | B2 | 1/2017 | Crawley |
| 9,561,941 | B1 | 2/2017 | Watts |
| 9,694,976 | B1 | 7/2017 | Wurman et al. |
| 9,844,879 | B1 | 12/2017 | Cousins et al. |
| 2003/0165373 | A1 | 9/2003 | Felder et al. |
| 2005/0023052 | A1* | 2/2005 | Beck .............. B60K 7/0007 |
| | | | 180/24.07 |
| 2005/0131581 | A1* | 6/2005 | Sabe .............. G06V 20/64 |
| | | | 700/245 |
| 2005/0207876 | A1 | 9/2005 | Springwater |
| 2006/0237239 | A1 | 10/2006 | Bruner et al. |
| 2007/0257910 | A1* | 11/2007 | Gutmann .............. G06V 20/10 |
| | | | 700/262 |
| 2008/0294288 | A1 | 11/2008 | Yamauchi |
| 2012/0090110 | A1 | 4/2012 | Van Den Berg et al. |
| 2013/0110281 | A1 | 5/2013 | Jones et al. |
| 2013/0332021 | A1 | 12/2013 | Goren |
| 2014/0136414 | A1 | 5/2014 | Abhyanker |
| 2014/0254896 | A1 | 9/2014 | Zhou et al. |
| 2014/0365258 | A1 | 12/2014 | Vestal et al. |
| 2015/0006005 | A1 | 1/2015 | Yu et al. |
| 2015/0045945 | A1 | 2/2015 | Zini et al. |
| 2015/0100152 | A1 | 4/2015 | Barragan Trevino et al. |
| 2015/0183581 | A1 | 7/2015 | Worsley |
| 2015/0202770 | A1* | 7/2015 | Patron .............. G06Q 30/0265 |
| | | | 901/50 |
| 2015/0228114 | A1* | 8/2015 | Shapira .............. G06T 15/04 |
| | | | 345/421 |
| 2015/0379468 | A1 | 12/2015 | Harvey |
| 2016/0185466 | A1 | 6/2016 | Dreano, Jr. |
| 2016/0207710 | A1 | 7/2016 | Conrad et al. |
| 2016/0325928 | A1 | 11/2016 | Lepek et al. |
| 2016/0355337 | A1 | 12/2016 | Lert et al. |
| 2016/0368464 | A1 | 12/2016 | Hassounah |
| 2017/0017237 | A1 | 1/2017 | Tokuyama et al. |
| 2017/0100837 | A1 | 4/2017 | Zevenbergen et al. |
| 2017/0185853 | A1 | 6/2017 | Yokota et al. |
| 2017/0220981 | A1 | 8/2017 | Shucker et al. |
| 2017/0267452 | A1 | 9/2017 | Goren et al. |
| 2018/0020896 | A1 | 1/2018 | High et al. |
| 2018/0349834 | A1 | 12/2018 | Heinla et al. |

OTHER PUBLICATIONS

Technopedia, Support Vector Machine (SVM), Oct. 3, 2016, technopedia.com, pp. 1 (Year: 2016).*
Klasing et al.: The Autonomous City Explorer: Towards Semantic Navigation in Urban Environments, Jan. 2008, Institute of Automatic Control Engineering (LSR), Technische Universität München.
M. Baker and H. A. Yanco, "Automated street crossing for assistive robots," 9th International Conference on Rehabilitation Robotics, 2005. ICORR 2005., Chicago, IL, 2005, pp. 187-192.
Jeniece Pettitt: "Forget-delivery-drones-meet-your-new-delivery-robo", Nov. 2, 2015, CNBC, Retrieved from the Internet: URL: https://www.cnbc.com/2015/11/02/forget-delivery-drones-meet-your-new-delivery-robot.html.
Anonymous: "Lieferroboter Starship: "Klauen würde ich ihn nicht" (Delivery robot Starship "I would not claw him")—Auto—Tagesspiegel",Nov. 29, 2015; Retrieved from the Internet: URL: http://www.tagesspiegel.de/mobil/lieferroboter-starship-klauen-wuerde-ich-ihn-nicht/12647114.html [computer translation provided].
WIPO, International Preliminary Report on Patentability Chapter I, PCT/EP2017/082267 [6 pgs.], dated Jun. 18, 2019.
WIPO, Written Opinion of the International Searching Authority, PCT/EP2017/082267 [5 pgs.], dated Jun. 21, 2018.
WIPO, International Search Report, PCT/EP2017/082267 [3 pgs.], dated Jun. 21, 2018.
WO 2011035839 Abstract.

* cited by examiner

FIG. 12 (a)
FIG.12 (b)
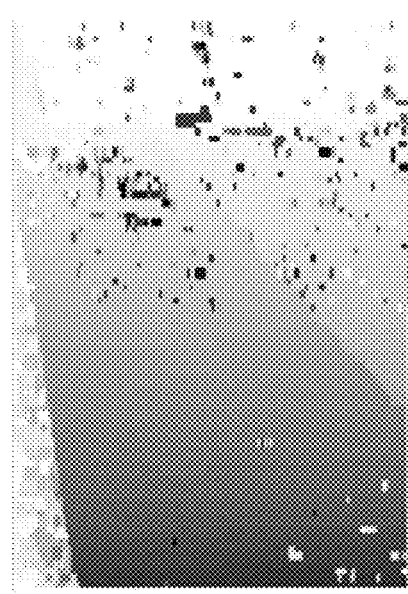
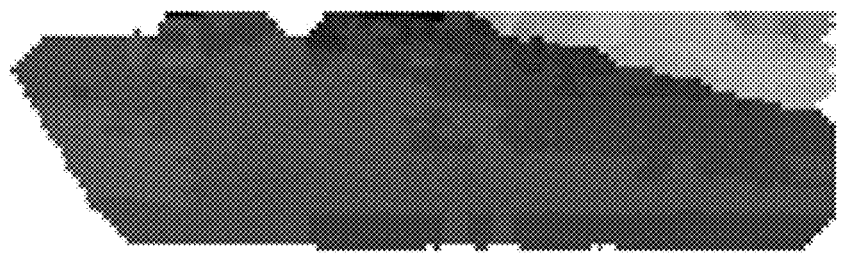
FIG. 12 (c)
FIG. 12 (d)
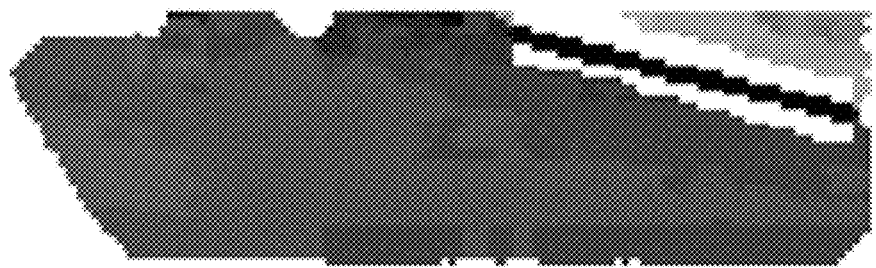
FIG. 12 (e)

ROBOT, SYSTEM AND METHOD DETECTING AND/OR RESPONDING TO TRANSITIONS IN HEIGHT

RELATED APPLICATIONS

This application is a continuation of PCT/EP2017/082267, published as WO 2018/108832 A1, filed Dec. 11, 2017, which claims priority from EP 16204153.7, filed Dec. 14, 2016, the entire contents of each of which are hereby fully incorporated herein by reference for all purposes.

FIELD

The present invention generally relates to the detection of obstacles and/or to responding to such obstacles, e.g., transitions.

INTRODUCTION

In recent years, autonomous, self-driving or self-navigating robots have gained some attention. It is desired that such robots are able to navigate and drive safely without human interaction or almost without human interaction.

In that regard, it is advantageous for the robot to be able to detect obstacles, particularly obstacles in the way the robot is travelling. After detection of such obstacles, the robot may change its route to avoid the detected obstacles.

For example, Klasing et al, The Autonomous City Explorer: Towards Semantic Navigation in Urban Environments, January 2008, discloses a robot comprising two laser range scanners for the detection of obstacles in the way of the robot. One of the laser range scanners is mounted to perform horizontal scans at a fixed height above the ground and the other laser range finder is mounted at a downward looking angle to capture the ground in front of the robot. When an obstacle is detected, the robot adapts its route to avoid the obstacle.

While such a procedure may be sufficient in some instances, it has certain drawbacks, disadvantages, and limitations. In particular, the robot discussed in Klasing et al. merely avoids the detected obstacles. Thus, this robot is limited to routes not comprising obstacles. While such a robot may be sufficient for test purposes, the limitation of the routes may limit the practical usability of such a robot in realistic usage scenarios. Furthermore, by the robot having to use two laser scanners, the robot's detection mechanism may be relatively complex and prone to failure.

In light of the above, it is an object of the present technology to overcome or at least alleviate the shortcomings and disadvantages of the prior art. In particular, it is an object of the present technology to provide a method and a corresponding robot and system that allow the robot to better detect obstacles and to respond to the obstacles. In particular, the robot may also be adapted to thereby traverse obstacles. It is a still further object of the present technology to thus provide a robot with the ability to reach a greater range of destinations (instead of being limited to destinations connected by routes without any obstacles) to thereby increase the overall usability of such a robot. Still further objects of the present technology pertain to further improvements in such robots, systems, and methods.

In particular, it may be an object of the present technology to provide a robot, a system and a corresponding method allowing a robot to respond to curbstones and/or to traverse curbstones, that is, to traverse from a street to a sidewalk and/or vice versa.

SUMMARY

These and other objects are met by the presently disclosed technology.

According to a first embodiment, these objects are met by a method of a robot responding to a transition between height levels, the method comprising a robot travelling. The method also comprises sensing information of the surroundings of the robot and generating a three dimensional data set corresponding to a heightmap of the surroundings of the robot based on the information, detecting a transition between different height levels in the three dimensional data set, categorizing the transition between the different height levels by means of at least one characteristic, and the robot performing a response action, which response action depends on the categorization of the transition.

That is, this method starts with a robot that travels. For example, the robot may drive on the street and/or on a walkway. Information on the surroundings of the robots are sensed. For example, a sensor, such as a camera, may sense information on the surroundings of the robot. Based on this information, a three dimensional data set is generated. This data set corresponds to a heightmap of the surroundings of the robot. The data set may comprise 2 ground dimensions (e.g., x- and y-dimensions) and a vertical dimension (e.g., z-dimension or the height). In this data set, a transition between different height levels may be detected, e.g., a zone where the height changes. One example is the transition from a street to a pedestrian walkway. Thus, a curb stone may be detected. The transition may then be categorized. For example, it may be categorized as a traversable or a non-traversable transition. This categorization is performed based on at least one characteristic (for example, the height or steepness of the transition). Depending on the categorization, the robot performs a response action, e.g., it climbs the transition.

Thus, a method is provided for the robot to respond to the transition. In particular, the robot may "decide" whether a transition can be traversed, and may, in some instances, climb the transition. Thus, a robot is provided which can be used in the real world environment. The robot is no longer limited to flat surroundings, but may also be employed on the streets and on walkways, thereby increasing the practical usability of the robot.

The step of sensing information may be performed by the robot.

The step of detecting a transition between different height levels and/or the step of categorizing the transition between the different height levels by means of at least one characteristic may be performed by the robot.

The robot may comprise at least one range sensor and the step of the robot sensing information of the surroundings of the robot may be performed by the at least one range sensor. These sensors may be particularly useful to sense the surroundings of the robot.

The at least one range sensor may comprise an ultrasonic sensor, lidar, a time-of-flight camera and/or a laser range finder.

The at least one range sensor may comprise a plurality of range sensors.

The robot may comprise a 3D camera and the step of the robot sensing information of the surroundings of the robot may be performed by the 3D camera.

The 3D camera may be a stereo camera. This may be a particularly simply choice of the sensor. It may be more readily available than other and more sophisticated sensors. Moreover, this may also simplify servicing of the sensor.

The 3D camera may comprise a depth sensor.

The at least one characteristic may comprise the vertical extension between the different height levels.

The at least one characteristic may comprise the horizontal orthogonal length of the transition. The horizontal orthogonal length typically is the length of the transition along the gradient of the transition.

The at least one characteristic may comprise the shape of the transition.

The response action may be a traversing action to traverse the transition.

The traversing action may comprise the robot changing its speed.

The traversing action may comprise the robot increasing its speed.

The traversing action may comprise the robot increasing its speed to 5 to 9 km/h.

The traversing action may be a climbing action to climb the transition.

The transition between the different height levels may have a vertical extension in the range of 5 cm to 25 cm, preferably in the range of 15 cm to 20 cm.

The transition may comprise a vertical face.

The robot may comprise wheels.

The robot may comprise three wheel sets of wheels, each wheel set comprising at least one wheel and one of the wheel sets comprising at least two wheels, wherein the wheel sets comprise a front wheel set, a center wheel set and a back wheel set, wherein the at least one wheel of the front wheel set is rotatable around a front axis of rotation, wherein the at least one wheel of the center wheel set is rotatable around a center axis of rotation, wherein the at least one wheel of the back wheel set is rotatable around a back axis of rotation. The center axis of rotation and the back axis of rotation may define a plane, and the climbing action may comprise a distance between the front axis of rotation and the plane being altered. That is, simply put, the robot may "rear" when climbing the transition. This may be a particularly simple and fail safe way to climb the transition.

The distance between the front axis of rotation and the plane may be altered by a value in the range of 10 cm to 25 cm, preferably in the range of 15 cm to 20 cm. Thus, a relatively wide range of transitions may be climbed by the robot.

The method may further comprise determining the height level on which the robot is travelling, and determining whether another height level on which the robot is not travelling has an area sufficient to support the robot.

The robot may have a width in the range of 20 to 100 cm, preferably 40 to 70 cm, such as about 55 cm.

The robot may have a height in the range of 20 to 100 cm, preferably 40 to 70 cm, such as about 60 cm.

The robot may have a length in the range of 30 to 120 cm, preferably 50 to 80 cm, such as about 65 cm.

The robot may have a weight in the range of 2 to 50 kg, preferably in 5 to 40 kg, more preferably 7 to 25 kg, such as 10 to 20 kg.

The above dimensions may render the robot small enough not to inadequately harm other traffic participants.

The robot may be land-based. That is, the robot may not be adapted to fly or swim.

The robot may be adapted not to travel with a speed exceeding 10 km/h, preferably 8 km/h, more preferably 6 km/h. That is, the robot may be limited to relatively low speeds. This may be advantageous for different reasons. By travelling with a limited speed only, the risk for both the robot and other traffic participants may be low. Furthermore, energy consumption may be low when only travelling with a limited speed. Furthermore, by only travelling with a limited speed, only a smaller range of the surroundings of the robot has to be monitored. This may simplify and speed up the calculation process.

The wheels may comprise a diameter in the range of 5 cm to 40 cm, preferably 10 to 30 cm, such as 15 to 25 cm.

The center of mass of the robot may be located within a range of 5 cm to 50 cm from the ground, preferably 10 cm to 30 cm from the ground, such as approximately 20 cm from the ground. This may lead to a particularly stable configuration of the robot.

The step(s) of generating a three dimensional data set corresponding to a heightmap of the surroundings of the robot based on the information, detecting a transition between different height levels in the three dimensional data set and/or categorizing the transition between the different height levels by means of at least one characteristic may be performed by a central processing unit.

The step(s) of generating a three dimensional data set corresponding to a heightmap of the surroundings of the robot based on the information, detecting a transition between different height levels in the three dimensional data set and/or categorizing the transition between the different height levels by means of at least one characteristic may be performed by a graphics processing unit.

The step of generating a three dimensional data set may comprise a perspective transformation of coordinates. This may simplify the further calculation process.

According to a further embodiment, the above object is also solved by a method to detect a transition between different height levels in a three dimensional data set. The method comprises allocating data points in the three dimensional data set to different bins, depending on the height of the data points, identifying the two bins with the most data points, and generating a boundary between the two bins with the most data points by means of a classifier algorithm, the boundary corresponding to the transition between different height levels. Thus, a particularly simple and stable method to detect a transition between different height levels may be provided.

Generating a boundary between the two bins with the most data points by means of a classifier algorithm may comprise selecting first subsets of the data points of the two bins with the most data points, generating a first boundary by means of a first classifier algorithm performed on the first subsets, selecting second subsets of data points of the two bins with the most data points, and generating a second boundary by means of a second classifier algorithm performed on the second subsets. That is, in a first step, only some points of the two bins with the most data points may be used by the algorithm and in a second step, also only some points of these bins may be used. This may decrease the time required to detect the transition and/or the requirements on the equipment used to detect the transition, e.g., the requirements on the data processing means used to employ this method. Decreasing the time required to detect the transition may be of interest, as one may want a robot to react to such a transition relatively fast.

The respective first subsets of data points of the two bins with the most data points may be selected from data points lying within a predetermined distance from the respective mean value of the data points within the respective bin. This may be an apt selection of data points for the first subset of data points.

The second subsets of data points of the two bins with the most data points may be selected from data points lying within a predetermined distance from the first boundary.

The classifier algorithm may be a linear classifier algorithm In such a scenario, the boundary would typically be straight, i.e., a straight dividing line. However, as will be understood, the boundary may also be curved.

The linear classifier algorithm may be a support vector machine algorithm.

The first and the second classifier algorithms may be linear classifier algorithms and may in particular be support vector machine algorithms.

In the method of a robot responding to a transition between height levels, the step of detecting a transition between different height levels in the three dimensional data set may comprise any of the steps recited in the above paragraphs.

The invention also relates to a method to detect a transition between different height levels in a first three dimensional data set generated by a stereo camera system, wherein the three dimensions of the first data set correspond to three spatial dimensions. The method comprises transforming the first data set to a second three dimensional data set, the second three dimensional data set being defined by one horizontal dimension, one vertical dimension and by a measure of disparity, detecting a transition between different height levels in the second three dimensional data set, and transforming the transition to the first three dimensional data set. This method may be computational simple (i.e., requiring only a limited amount of computational power and being fast) and stable. Typically, e.g., when using a picture generated by a stereo camera system, the first data set does not have a uniform density. Put differently, the closer an object is to the camera, the more pixels are used to represent this pixel. Thus, the closer an object is to the camera, the higher its density in pixels will be. This may be problematic in subsequent data analysis. The described method of detecting a transition may transform such a data set with non-uniform density into a data set with an (at least more) uniform density, which may be beneficial for subsequent analysis. Again, this may decrease the requirements on the data processing means and/or the time require to detect a transition. Such advantages may be important, as there may be only limited space (e.g., in a robot) for the data processing components. Furthermore, it may also be advantageous to have the detection performed fast, as the detection of different height levels may require a reaction by the robot. Thus, the functionality and fail safety of the robot may be increased.

The step of detecting a transition between different height levels may comprise calculating a gradient of the vertical dimension in the second three dimensional data set and identifying values of the gradient exceeding a threshold as a transition between different height levels.

The method to detect a transition may comprise linking transitions between different height levels in the second three dimensional data set into at least one continuous transition line.

In the method of a robot responding to a transition between height levels, the step of detecting a transition between different height levels in the three dimensional data set may comprise any of the steps recited in the above paragraphs.

The above identified objects are also met by a system. The system comprises a robot adapted to travel, a sensor adapted to sense information of the surroundings of the robot, data processing means configured to generate a three dimensional data set corresponding to a heightmap of the surroundings of the robot based on the information of the surroundings of the robot, detect a transition between different height levels in the three dimensional data set, and categorize the transition between the different height levels by means of at least one characteristic. The robot is adapted to perform at least one response action, which response action depends on the categorization of the transition. It will be understood that the system may have advantages corresponding to the advantages discussed above in conjunction with the robot. This may apply to the system discussed in this paragraph, and also to the optional features of the system discussed below.

The robot may comprise at least part of the data processing means. That is, at least some of the calculations discussed above may be performed by the robot.

The robot may comprise the data processing means. That is, all of the calculations discussed may be performed by the robot. This may omit the need of having external data processing means performing any of the calculations. Thus, no such data need to be sent from the robot to an external data processing means, which may decrease the time required.

The sensor may comprise at least one range sensor.

The at least one range sensor may comprise an ultrasonic sensor, a lidar, a time-of-flight camera and/or a laser range finder.

The at least one range sensor may comprise a plurality of range sensors.

The sensor may comprise a 3D camera.

The 3D camera may be a stereo camera.

The 3D camera may comprise a depth sensor.

The at least one characteristic may comprise the vertical extension between the different height levels.

The at least one characteristic may comprise the horizontal orthogonal length of the transition.

The at least one characteristic may comprise the shape of the transition.

The response action may be a traversing action to traverse the transition.

The robot may be adapted to perform a climbing action to climb the transition.

The robot may be adapted to climb a transition having vertical face and a vertical extension in the range of 5 cm to 25 cm, preferably in the range of 15 cm to 20 cm.

The robot may comprise wheels.

The robot may comprise three wheel sets of wheels, each wheel set comprising at least one wheel and one of the wheel sets comprising at least two wheels, wherein the wheel sets comprise a front wheel set, a center wheel set and a back wheel set, wherein the at least one wheel of the front wheel set is rotatable around a front axis of rotation, wherein the at least one wheel of the center wheel set is rotatable around a center axis of rotation, wherein the at least one wheel of the back wheel set is rotatable around a back axis of rotation, wherein the center axis of rotation and the back axis of rotation define a plane, and wherein a distance between the front axis of rotation and the plane is adjustable.

The distance between the front axis of rotation and the plane may be adjustable by a value in the range of 10 cm to 25 cm, preferably in the range of 15 cm to 20 cm.

The data processing means may be configured to determine the height level on which the robot is travelling, and determine whether another height level on which the robot is not travelling has an area sufficient to support the robot.

The robot may have a width in the range of 20 to 100 cm, preferably 40 to 70 cm, such as about 55 cm.

The robot may have a height in the range of 20 to 100 cm, preferably 40 to 70 cm, such as about 60 cm.

The robot may have a length in the range of 30 to 120 cm, preferably 50 to 80 cm, such as about 65 cm.

The robot may have a weight in the range of 2 to 50 kg, preferably in 5 to 40 kg, more preferably 7 to 25 kg, such as 10 to 20 kg.

The robot may be land-based.

The robot may be adapted not to travel with a speed exceeding 10 km/h, preferably 8 km/h, more preferably 6 km/h.

The wheels may comprise a diameter in the range of 5 cm to 40 cm, preferably 10 cm to 30 cm, such as 15 to 25 cm.

The center of mass may be located within a range of 5 cm to 50 cm from the ground, preferably 10 cm to 30 cm from the ground, such as approximately 20 cm from the ground.

The data processing means may comprise a central processing unit adapted to perform the step(s) of generating a three dimensional data set corresponding to a heightmap of the surroundings of the robot based on the information, detecting a transition between different height levels in the three dimensional data set and/or categorizing the transition between the different height levels by means of at least one characteristic.

The data processing means may comprise a graphics processing unit adapted to perform the step(s) of generating a three dimensional data set corresponding to a heightmap of the surroundings of the robot based on the information, detecting a transition between different height levels in the three dimensional data set and/or categorizing the transition between the different height levels by means of at least one characteristic.

The data processing means is configured to perform a perspective transformation of coordinates in the step of generating a three dimensional data set.

The present invention also generally relates to a data processing means adapted to detect a transition between different height levels in a three dimensional data set. The data processing means is configured for allocating data points in the three dimensional data set to different bins, depending on the height of the data points, identifying the two bins with the most data points, and generating a boundary between the two bins with the most data points by means of a classifier algorithm, the boundary corresponding to the transition between different height levels. Again, this data processing means may have corresponding advantages as the advantages discussed above with regard to the respective method.

More particularly, the data processing means may be configured such that generating a boundary between the two bins with the most data points by means of a classifier algorithm comprises selecting first subsets of the data points of the two bins with the most data points, generating a first boundary by means of a first classifier algorithm performed on the first subsets, selecting second subsets of data points of the two bins with the most data points, and generating a second boundary by means of a second classifier algorithm performed on the second subsets.

The data processing means may be configured for selecting the respective first subsets of data points of the two bins with the most data points from data points lying within a predetermined distance from the respective mean value of the data points within the respective bin.

The data processing means may be configured for selecting the second subsets of data points of the two bins with the most data points from data points lying within a predetermined distance from the first boundary.

Again, the classifier algorithm may be a linear classifier algorithm, and, in one embodiment, the linear classifier algorithm may be a support vector machine algorithm.

The first and the second classifier algorithms may also be linear classifier algorithms and in particular may be support vector machine algorithms.

In the system discussed above, the data processing means may be a data processing means as discussed in any of the previous paragraphs.

Furthermore, the present invention also relates to a data processing means adapted to detect a transition between different height levels in a first three dimensional data set generated by a stereo camera system. In this data processing means, the three dimensions of the first data set correspond to three spatial dimensions. The data processing means is configured for transforming the first data set to a second three dimensional data set, the second three dimensional data set being defined by one horizontal dimension, one vertical dimension and by a measure of disparity, detecting a transition between different height levels in the second three dimensional data set, and transforming the transition to the first three dimensional data set. Here, considerations corresponding to the respective method apply.

This data processing means may be configured such that the step of detecting a transition between different height levels comprises calculating a gradient of the vertical dimension in the second three dimensional data set and identifying values of the gradient exceeding a threshold as a transition between different height levels.

This data processing means may be configured for linking transitions between different height levels in the second three dimensional data set into at least one continuous transition line.

In the system discussed above, the data processing means may be a data processing means as discussed in any of the previous paragraphs.

The present invention is also defined by the following numbered embodiments.

M1. A method of a robot (30) responding to a transition (40) between height levels, the method comprising
a robot (30) travelling,
sensing information of the surroundings of the robot (30) and generating a three dimensional data set corresponding to a heightmap of the surroundings of the robot (30) based on the information,
detecting a transition (40) between different height levels (10, 20) in the three dimensional data set,
categorizing the transition (40) between the different height levels (10, 20) by means of at least one characteristic,
the robot (30) performing a response action, which response action depends on the categorization of the transition (40).

M2. The method in accordance with the preceding embodiment, wherein the step of sensing information is performed by the robot (30).

M3. The method in accordance with any of the preceding embodiments, wherein the step of detecting a transition (40) between different height levels (10, 20) and/or the step of categorizing the transition (40) between the different height levels (10, 20) by means of at least one characteristic is/are performed by the robot (30).

M4. The method in accordance with any one of the preceding embodiments, wherein the robot (30) comprises at least one range sensor and the step of the robot (30) sensing information of the surroundings of the robot (30) is performed by the at least one range sensor.

M5. The method in accordance with the preceding embodiment, wherein the at least one range sensor comprises an ultrasonic sensor, a lidar, a time-of-flight camera and/or a laser range finder.

M6. The method in accordance with any of the two preceding embodiments, wherein the at least one range sensor comprises a plurality of range sensors.

M7. The method in accordance with any of the three preceding embodiments with the features of embodiment M2,
wherein the robot (30) comprises a 3D camera and the step of the robot (30) sensing information of the surroundings of the robot (30) is performed by the 3D camera.

M8. The method in accordance with the preceding embodiment, wherein the 3D camera is a stereo camera.

M9. The method in accordance with any of the two preceding embodiments, wherein the 3D camera comprises a depth sensor.

M10. The method in accordance with any of the preceding embodiments, wherein the at least one characteristic comprises the vertical extension between the different height levels.

M11. The method in accordance with any of the preceding embodiments, wherein the at least one characteristic comprises the horizontal orthogonal length of the transition.

M12. The method in accordance with any of the preceding embodiments, wherein the at least one characteristic comprises the shape of the transition.

M13. The method in accordance with any of the preceding embodiments, wherein the response action is a traversing action to traverse the transition (40).

M14. The method in accordance with the preceding embodiment, wherein the traversing action comprises the robot (30) changing its speed.

M15. The method in accordance with the preceding embodiment, wherein the traversing action comprises the robot (30) increasing its speed.

M16. The method in accordance with the preceding embodiment, wherein the traversing action comprises the robot (30) increasing its speed to 5 to 9 km/h.

M17. The method in accordance with any of the preceding four embodiments, wherein the traversing action is a climbing action to climb the transition (40).

M18. The method in accordance with any one of the preceding embodiments, wherein the transition (40) between the different height levels (10, 20) has a vertical extension in the range of 5 cm to 25 cm, preferably in the range of 15 cm to 20 cm.

M19. The method in accordance with any of the preceding embodiments with the features of the preceding 2 embodiments, wherein the transition (40) comprises a vertical face.

M20. The method in accordance with any of the preceding embodiments, wherein the robot comprises wheels (304).

M21. The method in accordance with the preceding embodiment with the features of embodiment M17, wherein
the robot (30) comprises three wheel sets of wheels (304), each wheel set comprising at least one wheel (3042, 3044, 3046) and one of the wheel sets comprising at least two wheels,
wherein the wheel sets comprise a front wheel set, a center wheel set and a back wheel set,
wherein the at least one wheel (3042) of the front wheel set is rotatable around a front axis of rotation,
wherein the at least one wheel (3042) of the center wheel set is rotatable around a center axis of rotation,
wherein the at least one wheel (3042) of the back wheel set is rotatable around a back axis of rotation,
wherein the center axis of rotation and the back axis of rotation define a plane,
and wherein the climbing action comprises
a distance between the front axis of rotation and the plane being altered.

M22. The method in accordance with the preceding embodiment, wherein the distance between the front axis of rotation and the plane is altered by a value in the range of 10 cm to 25 cm, preferably in the range of 15 cm to 20 cm.

M23. The method in accordance with any of the preceding embodiments, wherein the method further comprises
determining the height level (10, 20) on which the robot (30) is travelling,
determining whether another height level (10, 20) on which the robot (30) is not travelling has an area sufficient to support the robot (30).

M24. The method in accordance with any of the preceding embodiments, wherein the robot (30) has a width in the range of 20 to 100 cm, preferably 40 to 70 cm, such as about 55 cm.

M25. The method in accordance with any of the preceding embodiments, wherein the robot (30) has a height in the range of 20 to 100 cm, preferably 40 to 70 cm, such as about 60 cm.

M26. The method in accordance with any of the preceding embodiments, wherein the robot (30) has a length in the range of 30 to 120 cm, preferably 50 to 80 cm, such as about 65 cm.

M27. The method in accordance with any of the preceding embodiments, wherein the robot (30) has a weight in the range of 2 to 50 kg, preferably in 5 to 40 kg, more preferably 7 to 25 kg, such as 10 to 20 kg.

M28. The method in accordance with any of the preceding embodiments, wherein the robot (30) is land-based.

M29. The method in accordance with any of the preceding embodiments, wherein the robot (30) is adapted not to travel with a speed exceeding 10 km/h, preferably 8 km/h, more preferably 6 km/h.

M30. The method in accordance with any of the preceding embodiments with the features of embodiment M20, wherein the wheels (304) comprise a diameter in the range of 5 cm to 40 cm, preferably 10 to 30 cm, such as 15 to 25 cm.

M31. The method in accordance with any of the preceding embodiments, wherein the center of mass of the robot (30) is located within a range of 5 cm to 50 cm from the ground, preferably 10 cm to 30 cm from the ground, such as approximately 20 cm from the ground.

M32. The method in accordance with any of the preceding embodiments, wherein the step(s) of generating a three dimensional data set corresponding to a heightmap of the surroundings of the robot (30) based on the information, detecting a transition (40) between different height levels (10, 20) in the three dimensional data set and/or categorizing the transition (40) between the different height levels (10, 20) by means of at least one characteristic is/are performed by a central processing unit.

M33. The method in accordance with any of the preceding embodiments without the features of the preceding embodiment, wherein the step(s) of generating a three dimensional data set corresponding to a heightmap of the surroundings of the robot (30) based on the information, detecting a transition (40) between different height levels (10, 20) in the three dimensional data set and/or categorizing the transition (40) between the different height levels (10, 20) by means of at least one characteristic is/are performed by a graphics processing unit.

M34. The method in accordance with any of the preceding embodiments, wherein the step of generating a three dimensional data set comprises a perspective transformation of coordinates.

M35. A method to detect a transition (40) between different height levels (10, 20) in a three dimensional data set, the method comprising
allocating data points in the three dimensional data set to different bins, depending on the height of the data points,
identifying the two bins with the most data points,
generating a boundary between the two bins with the most data points by means of a classifier algorithm, the boundary corresponding to the transition (40) between different height levels (10, 20).

M36. The method in accordance with the preceding embodiment, wherein generating a boundary between the two bins with the most data points by means of a classifier algorithm comprises
selecting first subsets of the data points of the two bins with the most data points,
generating a first boundary by means of a first classifier algorithm performed on the first subsets,
selecting second subsets of data points of the two bins with the most data points,
generating a second boundary by means of a second classifier algorithm performed on the second subsets.

M37. The method in accordance with the preceding embodiment, wherein the respective first subsets of data points of the two bins with the most data points are selected from data points lying within a predetermined distance from the respective mean value of the data points within the respective bin.

M38. The method in accordance with any of the two preceding embodiments, wherein the second subsets of data points of the two bins with the most data points are selected from data points lying within a predetermined distance from the first boundary.

M39. The method in accordance with any of the three preceding embodiments, wherein the classifier algorithm is a linear classifier algorithm and preferably a support vector machine algorithm.

M40. The method in accordance with any of the three preceding embodiments with the features of embodiment M36, wherein the first and the second classifier algorithms are linear classifier algorithms and preferably support vector machine algorithms.

M41. The method in accordance with any one of embodiments M1 to M34, wherein the step of detecting a transition between different height levels (10, 20) in the three dimensional data set comprises the steps of any one of embodiments M35 to M40.

M42. A method to detect a transition (40) between different height levels (10, 20) in a first three dimensional data set generated by a stereo camera system, wherein the three dimensions of the first data set correspond to three spatial dimensions, the method comprising
transforming the first data set to a second three dimensional data set, the second three dimensional data set being defined by one horizontal dimension, one vertical dimension and by a measure of disparity,
detecting a transition (40) between different height levels (10, 20) in the second three dimensional data set,
transforming the transition (40) to the first three dimensional data set.

M43. The method in accordance with the preceding embodiment, wherein the step of detecting a transition (40) between different height levels (10, 20) comprises calculating a gradient of the vertical dimension in the second three dimensional data set and identifying values of the gradient exceeding a threshold as a transition (40) between different height levels (10, 20).

M44. The method in accordance with any of the two preceding embodiments, wherein the method comprises linking transitions (40) between different height levels (10, 20) in the second three dimensional data set into at least one continuous transition line.

M45. The method in accordance with any one of embodiments M1 to M34 with the features of embodiment 8, wherein the step of detecting a transition between different height levels (10, 20) in the three dimensional data set comprises the steps of any one of embodiments M42 to M44.

Below, different system embodiments will be discussed. These embodiments are denoted as "S" embodiments, that is, they are denoted by an "S" (for system) followed by a number. When below reference is made to system embodiments, the embodiments denoted by an "S" are meant.

S1. A system comprising
a robot (30) adapted to travel,
a sensor (310) adapted to sense information of the surroundings of the robot (30),
data processing means configured to
generate a three dimensional data set corresponding to a heightmap of the surroundings of the robot (30) based on the information of the surroundings of the robot,
detect a transition (40) between different height levels (10, 20) in the three dimensional data set, and
categorize the transition (40) between the different height levels (10, 20) by means of at least one characteristic,
wherein the robot (30) is adapted to perform at least one response action, which response action depends on the categorization of the transition (40).

S2. The system in accordance with the preceding embodiment, wherein the robot (30) comprises at least part of the data processing means.

S3. The system in accordance with any of the preceding system embodiments, wherein the robot (30) comprises the data processing means.

S4. The system in accordance with any of the preceding system embodiments, wherein the sensor comprises at least one range sensor.

S5. The system in accordance with the preceding embodiment, wherein the at least one range sensor comprises an ultrasonic sensor, a lidar, a time-of-flight camera and/or a laser range finder.

S6. The system in accordance with any of the two preceding embodiments, wherein the at least one range sensor comprises a plurality of range sensors.

S7. The system in accordance with any of the preceding system embodiments, wherein the sensor (310) comprises a 3D camera.

S8. The system in accordance the preceding system embodiment, wherein the 3D camera is a stereo camera.

S9. The system in accordance with any of the 2 preceding embodiments, wherein the 3D camera comprises a depth sensor.

S10. The system in accordance with any of the preceding system embodiments, wherein the at least one characteristic comprises the vertical extension between the different height levels.

S11. The system in accordance with any of the preceding system embodiments, wherein the at least one characteristic comprises the horizontal orthogonal length of the transition.

S12. The system in accordance with any of the preceding system embodiments, wherein the at least one characteristic comprises the shape of the transition.

S13. The system in accordance with any of the preceding system embodiments, wherein the response action is a traversing action to traverse the transition (40).

S14. The system in accordance with any of the preceding system embodiments, wherein the robot (40) is adapted to perform a climbing action to climb the transition.

S15. The system in accordance with any of the preceding system embodiments, wherein the robot (30) is adapted to climb a transition (40) having vertical face and a vertical extension in the range of 5 cm to 25 cm, preferably in the range of 15 cm to 20 cm.

S16. The system in accordance with any of the preceding system embodiments, wherein the robot (30) comprises wheels (304).

S17. The system in accordance with the preceding embodiment, wherein
the robot (30) comprises three wheel sets of wheels (304), each wheel set comprising at least one wheel (3042, 3044, 3046) and one of the wheel sets comprising at least two wheels, wherein the wheel sets comprise a front wheel set, a center wheel set and a back wheel set,
wherein the at least one wheel (3042) of the front wheel set is rotatable around a front axis of rotation,
wherein the at least one wheel (3042) of the center wheel set is rotatable around a center axis of rotation,
wherein the at least one wheel (3042) of the back wheel set is rotatable around a back axis of rotation,
wherein the center axis of rotation and the back axis of rotation define a plane,
and wherein a distance between the front axis of rotation and the plane is adjustable.

S18. The system in accordance with the preceding embodiment, wherein the distance between the front axis of rotation and the plane is adjustable by a value in the range of 10 cm to 25 cm, preferably in the range of 15 cm to 20 cm.

S19. The system in accordance with any of the preceding system embodiments, wherein the data processing means is configured to
determine the height level (10, 20) on which the robot (30) is travelling,
determine whether another height level (10, 20) on which the robot (30) is not travelling has an area sufficient to support the robot (30).

S20. The system in accordance with any of the preceding system embodiments, wherein the robot (30) has a width in the range of 20 to 100 cm, preferably 40 to 70 cm, such as about 55 cm.

S21. The system in accordance with any of the preceding system embodiments, wherein the robot (30) has a height in the range of 20 to 100 cm, preferably 40 to 70 cm, such as about 60 cm.

S22. The system in accordance with any of the preceding system embodiments, wherein the robot (30) has a length in the range of 30 to 120 cm, preferably 50 to 80 cm, such as about 65 cm.

S23. The system in accordance with any of the preceding system embodiments, wherein the robot (30) has a weight in the range of 2 to 50 kg, preferably in 5 to 40 kg, more preferably 7 to 25 kg, such as 10 to 20 kg.

S24. The system in accordance with any of the preceding system embodiments, wherein the robot (30) is land-based.

S25. The system in accordance with any of the preceding system embodiments, wherein the robot (30) is adapted not to travel with a speed exceeding 10 km/h, preferably 8 km/h, more preferably 6 km/h.

S26. The system in accordance with any of the preceding system embodiments with the features of embodiment S16, wherein the wheels (304) comprise a diameter in the range of 5 cm to 40 cm, preferably 10 to 30 cm, such as 15 to 25 cm.

S27. The system in accordance with any of the preceding system embodiments, wherein the center of mass is located within a range of 5 cm.

S28. The system in accordance with any of the preceding system embodiments, wherein the data processing means comprises a central processing unit adapted to perform the step(s) of generating a three dimensional data set corresponding to a heightmap of the surroundings of the robot (30) based on the information, detecting a transition (40) between different height levels (10, 20) in the three dimensional data set and/or categorizing the transition (40) between the different height levels (10, 20) by means of at least one characteristic.

S29. The system in accordance with any of the preceding system embodiments without the features of the preceding aspect, wherein the data processing means comprises a graphics processing unit adapted to perform the step(s) of generating a three dimensional data set corresponding to a heightmap of the surroundings of the robot (30) based on the information, detecting a transition (40) between different height levels (10, 20) in the three dimensional data set and/or categorizing the transition (40) between the different height levels (10, 20) by means of at least one characteristic.

S30. The system in accordance with any of the preceding system embodiments, wherein the data processing means is configured to perform a perspective transformation of coordinates in the step of generating a three dimensional data set.

D1. A data processing means adapted to detect a transition (40) between different height levels (10, 20) in a three dimensional data set, wherein the data processing means is configured for
allocating data points in the three dimensional data set to different bins, depending on the height of the data points,
identifying the two bins with the most data points,
generating a boundary between the two bins with the most data points by means of a classifier algorithm, the boundary corresponding to the transition (40) between different height levels (10, 20).

D2. The data processing means in accordance with the preceding embodiment, wherein the data processing means is configured such that generating a boundary between the two bins with the most data points by means of a classifier algorithm comprises
selecting first subsets of the data points of the two bins with the most data points,
generating a first boundary by means of a linear classifier algorithm performed on the first subsets,
selecting second subsets of data points of the two bins with the most data points,
generating a second boundary by means of a second classifier algorithm performed on the second subsets.

D3. The data processing means in accordance with the preceding embodiment, wherein the data processing means is configured for selecting the respective first subsets of data points of the two bins with the most data points from data points lying within a predetermined distance from the respective mean value of the data points within the respective bin.

D4. The data processing means in accordance with any of the two preceding embodiments, wherein the data processing means is configured for selecting the second subsets of data points of the two bins with the most data points from data points lying within a predetermined distance from the first boundary.

D5. The data processing means in accordance with any of the preceding 4 embodiments, wherein the classifier algorithm is a linear classifier algorithm and preferably is a support vector machine algorithm.

D6. The data processing means in accordance with any of the preceding 4 embodiments with the features of embodiment D2, wherein the first and the second classifier algorithms are linear classifier algorithms and preferably support vector machine algorithms.

S31. The system in accordance with any one of embodiments S1 to S30, wherein the data processing means is a data processing means in accordance with any one of embodiments D1 to D6.

D7. A data processing means adapted to detect a transition (40) between different height levels (10, 20) in a first three dimensional data set generated by a stereo camera system, wherein the three dimensions of the first data set correspond to three spatial dimensions, wherein the data processing means is configured for
transforming the first data set to a second three dimensional data set, the second three dimensional data set being defined by one horizontal dimension, one vertical dimension and by a measure of disparity,
detecting a transition (40) between different height levels (10, 20) in the second three dimensional data set,
transforming the transition (40) to the first three dimensional data set.

D8. The data processing means in accordance with the preceding embodiment, wherein the data processing means is configured such that the step of detecting a transition (40) between different height levels (10, 20) comprises calculating a gradient of the vertical dimension in the second three dimensional data set and identifying values of the gradient exceeding a threshold as a transition (40) between different height levels (10, 20).

D9. The data processing means in accordance with any of the 2 preceding embodiments, wherein the data processing means is configured for linking transitions (40) between different height levels (10, 20) in the second three dimensional data set into at least one continuous transition line.

S32. The system in accordance with any one of embodiments S1 to S30 with the features of embodiment S8, wherein the data processing means is a data processing means in accordance with any one of embodiments D7 to D9.

The present technology will now be discussed with reference to the accompanying drawings.

BRIEF DESCRIPTION OF THE DRAWINGS

FIG. 1b depicts a cross sectional view along line Ia-Ia of FIG. 1a;

FIGS. 12(a) to 12(e) depict images to illustrate a transformation of a heightmap to a disparity image in accordance with some embodiments of the present technology.

DESCRIPTION OF EMBODIMENTS

Figure 1A:
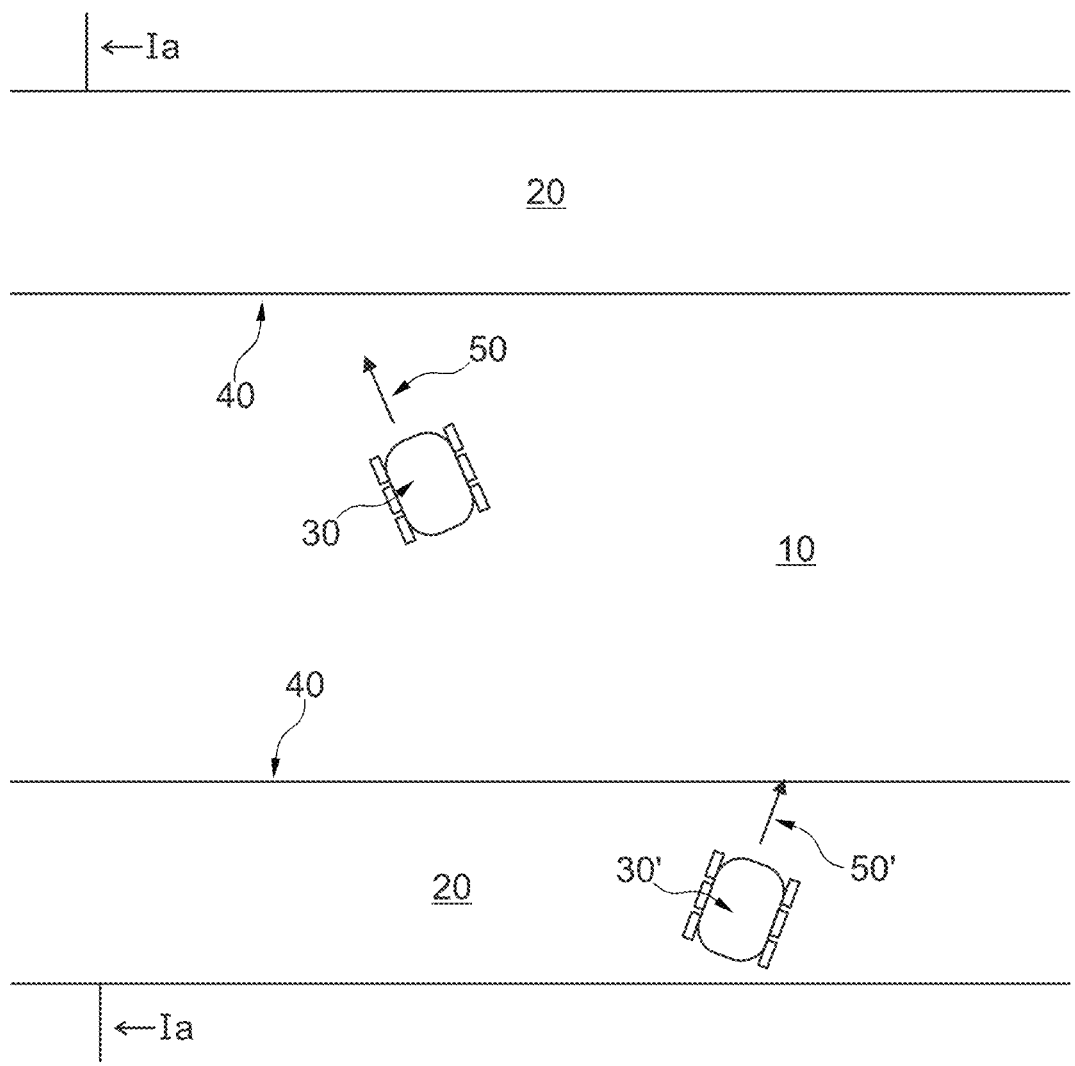
FIG. 1a depicts a top view of an environment where the present technology may be employed.
Figure 1B:
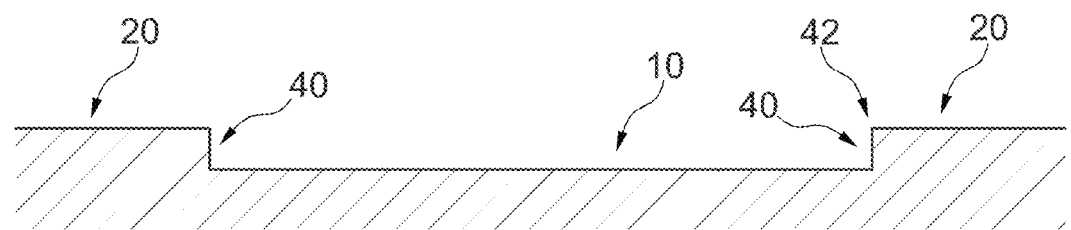

FIG. 1a generally depicts a top view of an environment in which the present technology may be employed. More particularly, FIG. 1a depicts a street 10 and two sidewalks 20, one on each side of the street 10. The sidewalks 20 are vertically offset from the street 10 (also see the cross sectional view of FIG. 1b), the offset typically being in the range of 50 mm to 250 mm, such as 100 mm to 200 mm. The transition from the street 10 to the sidewalk 20 is called a curb 40 or a curbstone 40, which curb 40 is indicated by a line in the top view of FIG. 1a. FIG. 1a also depicts two exemplary robots 30, 30', which robots 30, 30' are depicted in greater detail in the perspective view of FIG. 2.

Figure 2:
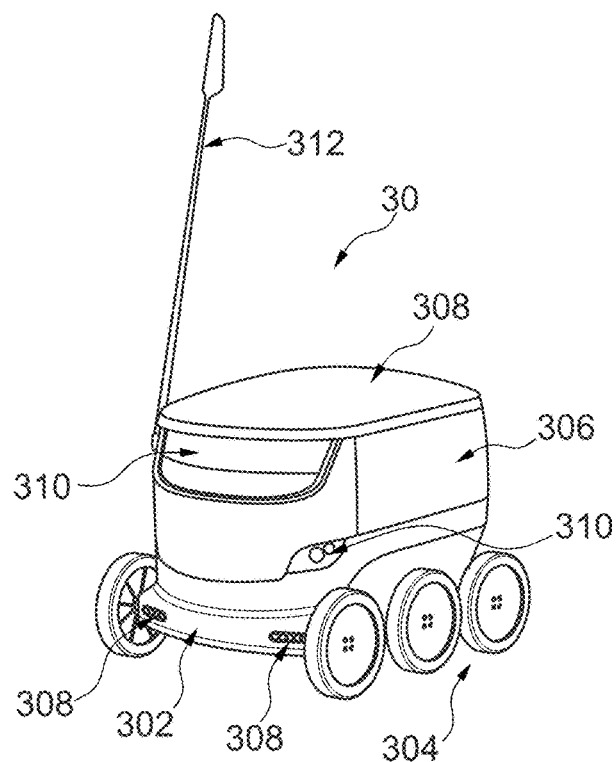
FIG. 2 depicts a robot for employing the present technology.

The robot 30 depicted in FIG. 2 may be an autonomous robot, that is a robot not requiring human interaction, or a semi-autonomous robot, requiring human interaction only in a very limited amount. The robot 30 may be a land-based or land-bound robot. It may comprise a frame 302 and wheels 304 mounted on the frame 302. In the depicted embodiment there are provided a total of 6 wheels 304. There are two front wheels defining a front wheel set, two center wheels defining a center wheel set and two back wheels defining a back wheel set. The robot 30 also comprises a body or housing 306, which comprises a compartment adapted to house or store goods or, more generally, items. This compartment may also be called a delivery compartment. The body 306 may be mounted on the frame 302. The robot 30 also typically comprises a lid 308 for closing the body or housing 306. That is, the lid 308 may assume a closed position depicted in FIG. 2 and an open position. In the closed position, there is no access to the goods in the delivery compartment of the body 306. In the open position of the lid 308 (not depicted), a person may reach into delivery compartment of the body 306 and obtain the goods from the inside of the body 306. The robot 30 may switch from the closed position to the open position in response to a person performing an opening procedure, such as the person entering a code or the person otherwise indicating that he/she is in a position to obtain the goods from the robot 30. For example, the person may access the delivery compartment by using a smartphone application, or the lid 308 may be automatically opened once the robot 30 has reached a predetermined location. The robot 30 may therefore be adapted to deliver the goods or items in the delivery compartment to the person and may therefore be referred to as a delivery robot. The robot 30 may also comprise lights 308, such as LEDs. Furthermore, in the depicted embodiment, the robot 30 includes a flagpole or stick 312, which may extend upwards. In certain embodiments, the flagpole 312 may serve as an antenna. Typical dimensions of the robot 30 may be as follows. Width: 20 to 100 cm, preferably 40 to 70 cm, such as about 55 cm. Height (excluding the flagpole): 20 to 100 cm, preferably 40 to 70 cm, such as about 60 cm. Length: 30 to 120 cm, preferably 50 to 80 cm, such as about 65 cm. The weight of the robot 30 may be in the range of 2 to 50 kg, preferably in 5 to 40 kg, more preferably 7 to 25 kg, such as 10 to 20 kg. The flagpole 312 may extend to an overall height of between 100 and 250 cm, preferably between 110 and 200 cm, such as between 120 and 170 cm. Such a height may be particularly advantageous such that the flagpole 312 and thus the overall robot 30 is easily seen by other traffic participants. The center of mass of the robot 30 may be located within a range of 5 cm to 50 cm from the ground, preferably 10 cm to 30 cm from the ground, such as approximately 20 cm from the ground. Such a center of mass, which center of mass is relatively close to the ground may lead to a particularly stable configuration of the robot 30.

Furthermore, the robot 30 may comprise at least one sensor 310 to obtain information about the robot's surroundings. In some embodiments, the sensor 310 may comprise one or more range sensor(s), such as an ultrasonic sensor, a Lidar sensor, a time-of-flight camera, and/or a laser range finder (the latter three may also be referred to as light-based range sensors). The sensor 310 (we note that the usage of the singular does not preclude the presence of a plurality) may comprise additionally or alternatively comprise a camera and more particularly, a 3D camera. Such a 3D camera may be a camera comprising a depth sensor and/or a stereo camera. Furthermore, such a 3D camera may be arranged such that it captures images "in front" of the robot 30, i.e. in the direction the robot 30 is adapted to travel. That is, the camera may be a front camera and particularly a front stereo camera, or, more generally, the sensor 310 may point to the front. Thus, the robot 30 may obtain 3D information about its surrounding environment. In other words, the sensor 310 may obtain a height profile of objects in the field of view of the camera, i.e. (x, y, z) coordinates. Alternatively or additionally, the robot 30 may comprise a sensor 310 arranged to capture images "in the back" of the robot 30, i.e. a back camera.

Turning back to FIG. 1a, such information may be used for the detection of obstacles and, in particular, for the detection of curbstones. Reference will now be made to the robot 30 depicted in FIG. 1a. Robot 30 is travelling in the direction generally indicated by arrow 50. In that regard, it is noted that robot 30 may be a slowly travelling robot 30. That is, robot 30 may be adapted not to travel with a speed exceeding 10 km/h, preferably 8 km/h, more preferably 6 km/h. Such a speed limitation may be advantageous for safety reasons. Further, it may also reduce energy consumption vis-à-vis a robot travelling with a faster speed. Moreover, its operation may also be simpler, and therefore more fail-safe than with robots that travel at higher speed. As discussed, robot 30 travels in the direction of arrow 50. It will be appreciated that when no further action is performed by the robot 30, it will eventually collide with the curbstone 40, as this curbstone 40 is located in the robot's direction of travel. This may or may not be problematic, depending on different circumstances including the exact design and dimensions of the curbstone 40. The curbstone 40 may have different designs. According to one design, the curbstone has a 90° edge 42, i.e. is vertical (see FIG. 1b and also FIG. 5b). However, it is also possible that the edge is beveled, that the curbstone is sloped (see FIG. 5d) or ramped (see FIG. 5c). Furthermore, also the dimensions of the curbstone 40 may vary. E.g., the curbstone may have a vertical extension or height H of 50 mm or of 200 mm. It will be appreciated that the actions the robot 30 needs to perform to traverse the curbstone 40 and get onto the sidewalk 20 may depend on the shape, design, and dimensions of the curbstone 40. For example, in case the curbstone 40 is a beveled, sloped, or ramped curbstone and/or the curbstone is of relatively small height (such as a vertical dimension of only 50 mm), the robot 30 may simply drive over the curbstone 40 and/or accelerate to traverse over the curbstone. In contrast to that, in case that the curbstone 40 comprises a 90° edge and/or is of a relatively big height (such as 150 mm), the robot 30 may perform a more sophisticated climbing mechanism to reach the sidewalk 40.

It may therefore or generally be desirable that the robot 30 detects its surrounding and particularly the exact dimensions of the environment in the direction the robot 30 is travelling. Thus, the robot 30 may detect the curbstone 40, its dimensions and shape, as well as potential other obstacles.

As discussed, the robot 30 may comprise a sensor (such as a Lidar or a 3D camera, such as a stereo camera or a camera comprising a depth sensor). By means of such a sensor, the robot 30 may obtain a 3D image (or, put differently, a 3D data set) of the surrounding of the robot 30 in the field of vision of the sensor (e.g., 3D camera).

Figure 3:
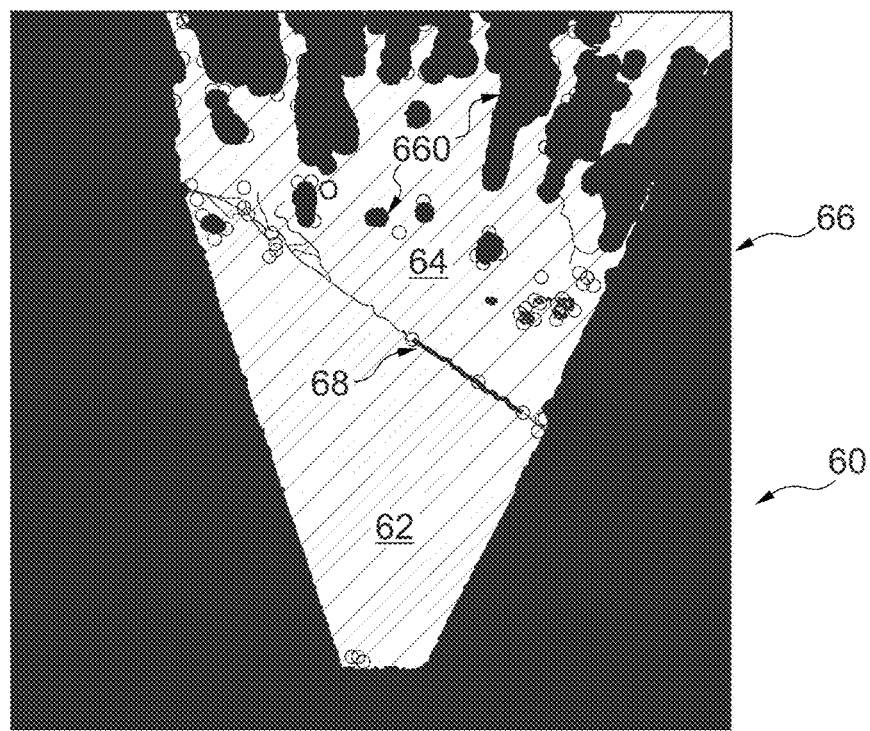
FIG. 3 depicts a heightmap of the surroundings of a robot.

A representation of such a 3D image or data set is reproduced in FIG. 3 and generally carries the reference numeral 60. This image 60 may be the image of the situation depicted in FIG. 1a for robot 30. The image 60 comprises different regions of sections. The black section 66 corresponds to portions for which no information is obtained. In particular, this section 66 includes the section lying outside the field of view of the sensor (e.g., 3D camera). Furthermore, FIG. 3 also shows black dots or sections 660 (only two of which are identified with a reference numeral for clarity of illustration). Such black dots or sections 660 correspond to "holes" in the height profile, i.e. to locations for which no satisfactory result could be obtained.

Figure 11B:
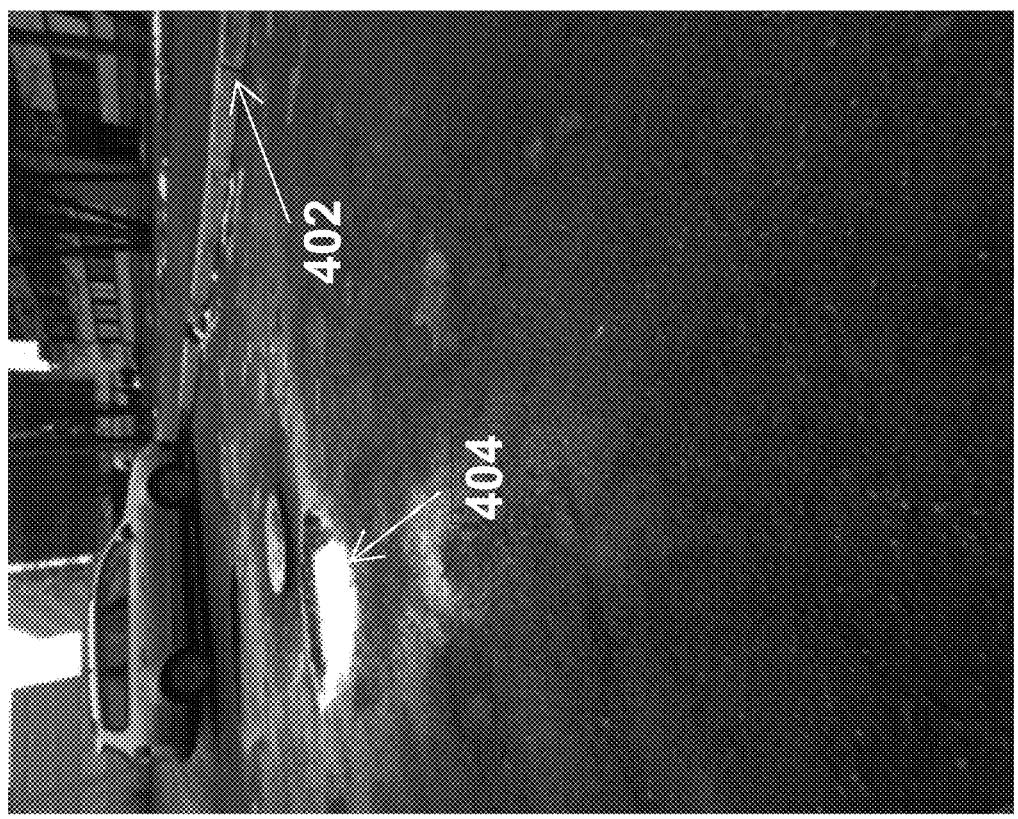
FIGS. 11a and 11b depict images taken from a two camera sensors of a stereo camera.
Figure 11A:
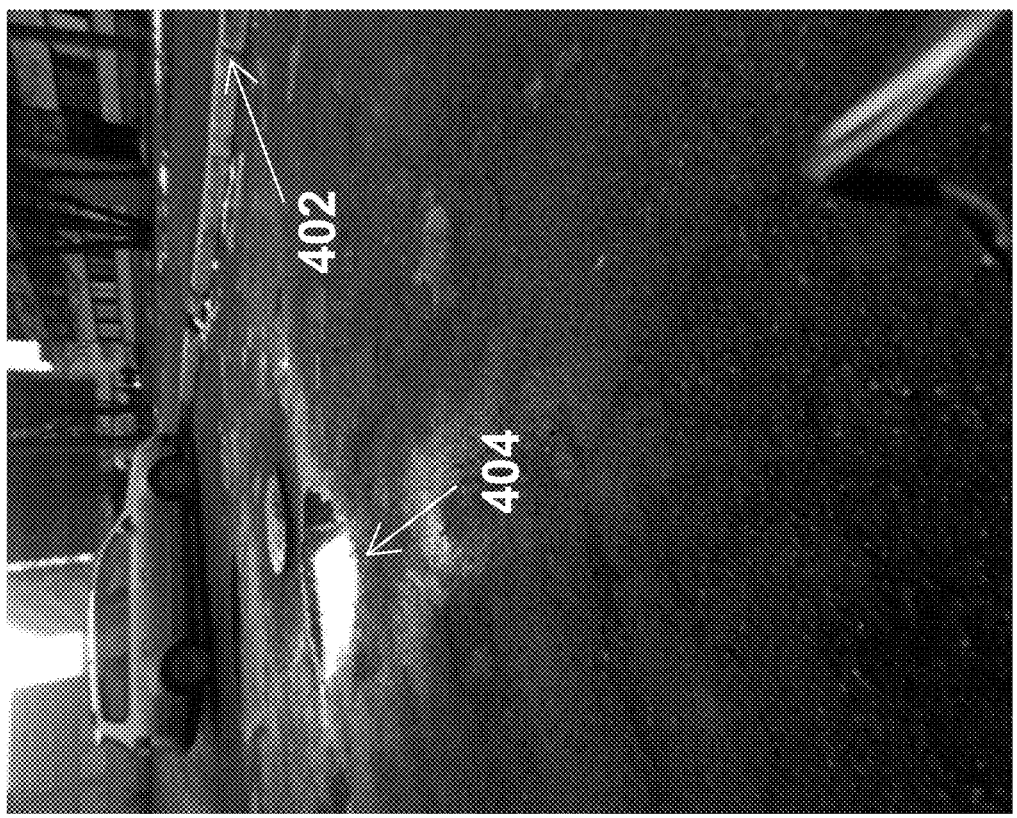

For example, the 3D camera may be realized as a stereo camera, i.e., as a camera having two (or more) camera sensors, such as lenses. Sets of images are repeatedly captured with the stereo camera, with each camera sensor producing one image in the set (approximately) simultaneously with the other camera sensor in the stereo camera. By identifying an object on the simultaneous images of such a plurality of camera sensors, the object's 3D location may be determined. In such a procedure, for each feature that is identified on multiple images, the location relative to the camera can be calculated from the parallax. Specifically, for each pixel in one image, one may find the best matching pixel in the other image(s), using the immediate neighborhood of the pixels to help with the matching. To reduce the computational complexity, the cameras may be calibrated, and the images transformed such that for a pixel on a line N in the left image, the corresponding pixel in the right image is also on line N, which is also known as stereo block matching (with slight modifications). This is further illustrated with reference to FIGS. 11a and 11b. FIGS. 11a and 11b depict simultaneous images captured by two camera sensors of a stereo camera, which images 11a and 11b will be called left and right images, respectively. These images include a separation 402 between two sections of a curbstone. The pixels corresponding to this separation 402 may be determined, that is, there are certain pixels of the separation 402 in the left image of FIG. 11a that can be matched to corresponding pixels on the right image of FIG. 11b. Thus, for such objects for which it is possible to match the pixels on different images to one another, it is possible to determine their 3D location. However, there may also be sections or spots for which such a matching is not possible. Consider the puddle 404 which mainly comprises white pixels on the left and right images in FIGS. 11a, 11b. It may be impossible to match any of the white pixels of puddle 404 in FIG. 11a to a corresponding pixel in FIG. 11b. As a result, the distance of the white pixels cannot be triangulated and the puddle will show up as unknown on the height map, i.e., as a black dot or section 660. That is, turning back to FIG. 3, the black dots 660 may arise from imperfections of the 3D sensor. As discussed, for a stereo camera, these spots may, e.g., be caused by smooth textureless surfaces, as for those kinds of surfaces, it may be impossible to tell which pixel on the left image corresponds to which pixel on the right image It will be appreciated that the density of these "holes" may increase with increasing distance from the camera. The detection of the height profile might therefore be limited to a distance from the robot 30 yielding satisfactory results, such as 5 meters. Furthermore, FIG. 3 also depicts two sections 62 and 64 and both these sections 62, 64 are hatched. It will be appreciated that section 62 is more densely hatched than section 64. The density of the hatching corresponds to the height. In the depicted Figures, generally speaking, the less densely an area is hatched, the higher the ground. That is, the more densely hatched section 62 corresponds to the lower level of the street 10 in FIG. 1a and the less densely hatched section 64 corresponds to the higher level of the sidewalk 20 in FIG. 1a.

In FIG. 3, there is also depicted a transition line 68 between the more densely hatched section 62 and the less densely hatched section 64. This transition line corresponds to the transition from the street 10 to the sidewalk 20, i.e., to the curbstone 40 and generally corresponds to an abrupt change in the height, which abrupt change is located on a substantially straight line. Such an abrupt change of the height located on a substantially straight line may be interpreted to correspond to a curbstone 40. That is, by means of detection of this transition in the image of the 3D camera, it is possible to detect the curbstone 40.

It will now be described how different height levels and transitions between such height levels may be detected, in one embodiment of the present technology.

A three dimensional data set corresponding to a heightmap of the surroundings of the robot may be generated. Such a heightmap is of the format (x, y, z), where a height (z) is assigned to points (x, y). The data set may also be referred to as a point cloud.

The present method may divide points in the point cloud into several bins, based on their z-coordinate (height in the robot coordinate system). As a mere example, each bin has a size of 1 cm, meaning that points with $0.5$ cm$\leq z<1.5$ cm would be grouped together in one bin (e.g., a point with $z=1.1$ cm and a point with $z=1.3$ cm). Typically (when the robot 30 is travelling on a substantially flat surface with no transitions in height), only one bin has many points in it and these points are on the ground surface. In case of a transition or elevation step, like a curbstone, there are two popular bins. For example, there may be one popular bin with $z=0$ cm (i.e., $-0.5$ cm$\leq z<0.5$ cm—"the ground bin") and one popular bin with $z=10$ cm (i.e., $9.5$ cm$\leq z<10.5$ cm—"the sidewalk bin"). In other words, if one were to plot the number of points in each bin (number of points at each height), one would find that it is a bimodal distribution, i.e. it will have two peaks. If such distribution is found, the presence of sidewalk and a curb separating the sidewalk from the street level is assumed.

The method then finds a boundary, which, in the present embodiment is a straight dividing line (corresponding to the curbstone edge) between the points in the two popular height bins. To find this straight dividing line best dividing the two sets of points, a support vector machine algorithm (SVM algorithm, or simply: SVM) may be used. While the described embodiment uses such an SVM algorithm, the skilled person will understand that other classifiers (and in particular linear classifiers) could also be employed. Depending on the data set and the used hardware, a standard SVM may be too slow (though in other instances, it may be sufficiently fast). In this regard, it should be born in mind that one potential use case of the present technology is a robot 30 traversing a street 10 and climbing a curbstone 40 while cars and/or other traffic participants are approaching. It will be understood that in such a scenario, it may be of interest that the detection of the curbstone 40 is done computationally fast. To accelerate the determination of where the curbstone 40 (that is, in the data set: the line separating the prominent bins) is, an adapted procedure may be used, which is described below.

Generally speaking, first, an SVM (or, generally: a classifier, such as a linear classifier) is run on a subset of the data to get a first boundary (e.g., a dividing line), which is an approximation of the boundary (e.g., the dividing line). Then, an SVM (or, generally, a classifier) is run on points "close" to the first boundary to refine this boundary, e.g., on points being separated from the boundary by no more than a predetermined distance or threshold. E.g., "n" points close to the line are found by iterating over all points and seeing if their distance to the line is below a certain threshold, where "n" is a predetermined integer (e.g., 100).

For the first iteration (that is, to get the first boundary), a random small amount of points (such as 30) in each point set may be used, where the point sets correspond to the points belonging to the same bin (e.g., one point set is defined by the points in the ground bin and one point set is defined by the sidewalk bin). Outliers may be excluded, e.g., by only choosing points from within a certain radius of the mean value of the point set (e.g., only points within one standard deviation of the point set may be used for the first iteration). It may also be an option that points closer to the mean are assigned a higher likelihood being picked than points farther away from the mean.

For the second iteration, points from each set that lie "close" to the first boundary may be used—again, points lying "close" to the first boundary may be points within a predetermined distance from the first boundary. In the second iteration, typically, more points (e.g., 300 points) may be used than in the first iteration, to get a second boundary, which is more refined. These points for the second iteration may be a randomly chosen subset of points being in the vicinity of (e.g., within a predetermined distance to) the first boundary. The distribution of the random process of choosing a point may be a uniform distribution. As an illustrative example, if there were a 1000 points in the neighborhood or vicinity of the first boundary (e.g., within a predetermined distance from the first dividing line), one would uniquely label them with numbers 1 to 1000 and then randomly select "N" of these points, for example, 300 of such points.

One may then also check whether the second boundary (i.e., the refined dividing line) is a good estimation for the curbstone 40. To do so, the second boundary may be used to predict the set that each point should belong to. If "enough" predictions are correct (i.e., SVM classifies a predetermined ratio of the points correctly to the two sets found in the second iteration discussed above), then the second boundary is identified to be a curb. Such a check will fail, for example, when the two point sets cannot be separated very well with a straight line. In other words, the refined dividing line is used to classify all points into two sets and then it is checked whether the set assigned with this prediction phase is (at least to a predetermined amount) the same as the set assigned in the binning phase. Put differently, it is checked if the refined dividing line can predict the z coordinate (elevation) from the x and y coordinates, by the means of seeing which side of the line the 2D point (x, y) lies.

As an alternative to using the above described binning process, one may also use an algorithm fitting 3D planes to different parts or sections of the point cloud to segment the point cloud into separate flat surfaces. Such a process could be relatively versatile and may also work with curbs on a slope (like when going uphill).

It will now be described how a data set corresponding to a heightmap of the surroundings of the robot may be generated and transformed for further processing.

It is noted that the calculations described above are done in a space where data points belonging to the same plane would be quite uniformly distributed to each other. However, the data is generated by camera 310, such as a stereo camera including two (or more) camera sensors (e.g., lenses), pointed forward and down.

Figure 9:
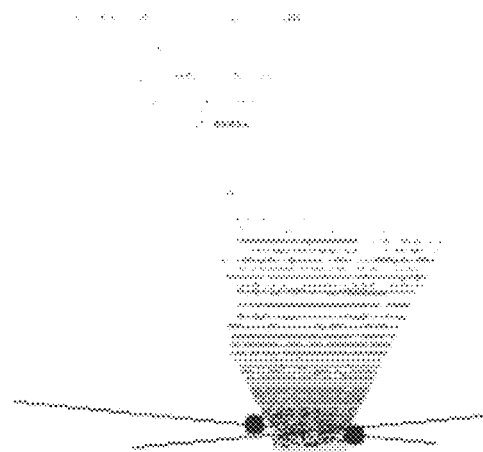
FIG. 9 depicts a data set of the surroundings of a robot corresponding to a heightmap.

As discussed, information (such as images) of the surroundings of the robot 30 are obtained (an in the case of images: captured). The camera 310 typically is pointed forward and downward. Generally, in such images, points on the ground that are closer to the camera 310 appear lower on the image and points of the ground that are further from the camera appear higher. Due to perspective, two neighboring pixels on a camera image that are closer to the camera are closer to each other in the real world than two neighboring pixels that depict points which are further from the camera. For example, an object with a length of 1 m having a distance of 2 m to the camera will be larger on the image than the same object (length 1 m) having a distance of 5 m from the camera. In turn, the object that is closer will be distributed over more pixels than the object that is further apart. So, from a top down view of the ground before the camera, it is visible that the point cloud gets less dense as the points are further apart from the camera (i.e., a pixel being representative for an increasing area). This is also depicted in FIG. 9, where it will be appreciated that the point cloud gets less dense the further it is removed from the camera capturing the image—i.e., in FIG. 9, the density is highest at the bottom of the figure and lowest at the top of the figure.

Figure 10:
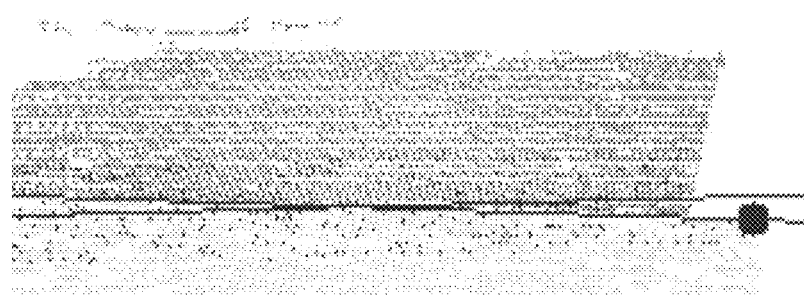
FIG. 10 depicts the data set of FIG. 9 after a perspective transformation.

For different reasons described below (mainly relating to the computational methods described above), it may be desirable to have the points uniformly distributed. To achieve this, a perspective transform on the x and y coordinates of the points is performed, which results in a transformed view. By means of the perspective transform, the point cloud represented in FIG. 9 is transformed into a point cloud represented in FIG. 10.

On these images the points with the different gray shades are the two flat surfaces of different elevation. The black lines are the line found after the first step and the final refined line.

The benefits of using points in such perspective-transformed, uniformly distributed manner, may include the following:

In the top-down view (see FIG. 9), points have different uncertainties, so one would need to use weights in any kind of fitting to take it into account.

In the top-down view (see FIG. 9), noise of the farther points is exaggerated, making an originally straight line look serpentine. This means that straight lines are straighter in the perspective-transformed view.

In the perspective-transformed view (see FIG. 10), in the proximity of a line (such as a curb), either side of the line has roughly the same number of points, making it easier to pick a balanced subsample of the two sets (SVM needs balanced sets, or alternatively, weights).

An alternative procedure to detect curb stones, or more generally height transitions in the surroundings of a robot, will now be described with reference to FIGS. 12(a) to 12(e). This procedure also transforms the obtained information to a data set with uniform density. Again, the procedure starts with stereo images, only one of which is depicted in FIG. 12(a). Out of these stereo images, a disparity image is generated (see FIG. 12(b)). This image is the color coded disparity of a pixel vs. the x- and y-coordinate of this pixel—the darker the color in the image, the larger the disparity. Generally, pixels close to the camera have a high disparity and therefore a darker color. The x- and y-coordinate are the coordinates defining the ground plane around the robot, i.e., they are the coordinates perpendicular to the height coordinate. The y-coordinate is the coordinate substantially parallel to the direction the camera is pointing to and the x-coordinate is perpendicular to the y-coordinate. FIG. 12(b) depicts the disparity of the pixels in the so defined coordinate system. The disparity of a pixel in a stereo image of a camera sensor is a measure for the distance between this pixel and the corresponding (or matching) pixel in the corresponding image of the other camera sensor. Consider again the case of having two stereo camera sensors capturing images of an object. When comparing the camera sensor images of the object (which will be called left and right images for sake of simplicity), the location of the object on the right image might be displaced by some pixels from the location of the object on the left image. This number of pixels is a measure for the disparity. It is clear that features that are closer to the camera sensors have a larger disparity than features that are further apart from the camera sensors. Thus, the closer a pixel, the higher the disparity. This can also be seen in FIG. 12(b), where the disparity is highest close to the camera sensors and gets smaller the further a pixel is removed from the camera sensors—i.e., the color is darkest close to the camera and gets successively lighter the further the pixels are removed from the camera.

In the further procedure depicted in FIGS. 12(a) to 12(e), the detected height of a pixel is drawn (in a color-coded format) against its x-coordinate and the disparity of a pixel. That is, instead of drawing the height (or elevation) of the pixels against the x-y-coordinates, the pixels' height is drawn against a coordinate system defined by the pixels' x-coordinate and the pixels' disparity (see FIG. 12(c) in that regard—the darker the color in this picture, the higher the elevation). This has the benefits of achieving a uniform density of the heightmap.

In the thus generated image, there may still be certain "holes", e.g., pixels for which no height could be obtained (the reason for which was described above with reference to FIGS. 11a and 11b). Such holes may be filled by estimating their height values from surrounding pixels.

Based on the picture depicted in FIG. 12(c), the edges in the height profile might be detected. Such edges may, for example, be points having a relatively high gradient, e.g., a gradient above a certain threshold. That is, the gradient may be calculated, i.e. the change in the detected height between neighboring pixels. The pixels having a great gradient (e.g., extreme points of the gradient) typically correspond to sharp transitions in the height, i.e. to edges and it is likely that the sharp transitions or edges belong to a curbstone. FIG. 12(d) depicts such extreme points of the gradient, i.e., pixels having a gradient exceeding a certain threshold.

Such points may be connected to one another in a continuous manner (see FIG. 12(e)), which results in lines corresponding to sharp transitions in the height profile, i.e. to curbstones.

Thus, one arrives at an estimate for the location of a curbstone in the coordinate system defined by the x-coordinate and the disparity. This may be easily mapped to a coordinate system defined by the x-coordinate and the y-coordinate to thereby arrive at an estimate for a curbstone (or, more generally: a sharp transition in the height profile) in the x-y-coordinate system.

By the above described procedures, information is sensed (e.g., images are captured), a data set is generated (in the described method also by transforming the data) and a transition in height levels is detected.

It will be appreciated that the sensor (e.g., the 3D camera) can also be used to detect the dimension and the shape of the curbstone 40. Such information may be used to trigger different "climbing" actions of the robot 30. E.g., the robot 30 may keep its speed and not transition into another mode of motion in case the curbstone 40 is relatively shallow and/or sloped, the robot 30 may transition into a special "climbing state" in case the curbstone 40 is particularly high and edged and the robot 30 may accelerate in front of the curbstone 40 in intermediate cases.

Above described detection of the height profile may be done in real-time, i.e. for every frame. Thus, the method may be computationally fast (also by the means described above). This is advantageous. For example, when the robot 30 traverses a street, the robot 30 ideally climbs onto the curbstone 40 relatively fast to avoid being hit by a car. The computation may be done on the CPU (central processing unit) and/or on the GPU (graphics processing unit). The present technology may identify curbstones 40 as abrupt transitions and differentiate such curbstones 40 from other structures, e.g., ramps. As discussed, the present technology detects the height of the ground in front of the robot 30 and/or behind the robot 30.

Figure 4:
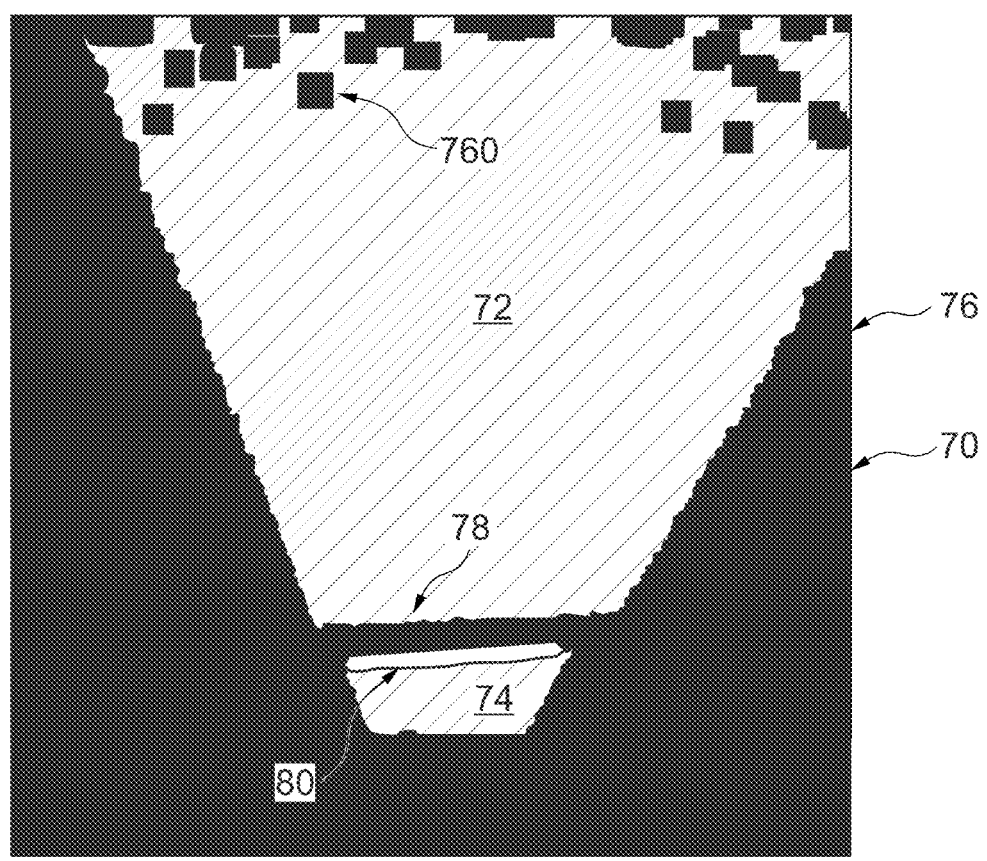
FIG. 4 depicts a further heightmap of the surroundings of a robot.

Furthermore, the present technology may also be used to detect a curbstone 40, when a robot 30' is travelling on the sidewalk—see the robot 30' travelling into direction of array 50' in FIG. 1a. Again, a sensor (e.g., a sensor comprising a Lidar sensor and/or a 3D camera) may be used to "scan" the surroundings of the robot 30'. A data set resulting from the sensor (e.g., an image resulting of the 3D camera) in such a situation is depicted in FIG. 4. The image generally carries the reference numeral 70 and again, there are different sections in this image 70. These sections mostly correspond to the sections discussed above in conjunction with FIG. 3. The sections include a black section 76 corresponding to the region outside the field of view of the 3D camera, as well as additional black sections or dots 760 again corresponding to "holes" in the height profile, i.e. to locations no satisfactory result could be obtained. Furthermore, FIG. 4 also depicts two hatched sections 72, 74, as well as an additional black band 78 separating the hatched sections 72, 74 from one another. Again, the section 72 having a denser hatching corresponds to the section having relatively lower height (i.e., the street 10) and the section 74 having a less dense hatching corresponds to the section having a relatively higher height (i.e., the sidewalk 20). The black band 78, as all black sections, corresponds to a section where no result for the height could be obtained. This corresponds to the "blind spot" of the sensor (e.g., Lidar or 3D camera), i.e. the section of the ground that is not visible for the sensor. The curbstone 40 corresponds to the transition from the first hatched section 74 (i.e., the hatched section 74 being closer to the sensor) to the black band 78. This transition is highlighted in white and carries the reference numeral 80 in FIG. 4. That is, the present technology also allows the robot 30' to detect the transition from sidewalk 20 to street 10, i.e. a "negative" obstacle.

Again, depending on the exact nature and dimensioning of the transition (e.g., the difference in height between the sidewalk and the street), the robot 30' may perform different actions or routines. E.g., the robot 30' may adjust its speed in preparation of the negative obstacle and/or take other preparatory actions in view of the obstacle.

As discussed, in the present technology, a 3D data set relating to the surrounding of the robot 40 may be obtained. In particular, this 3D data set comprises the height profile of the surroundings of the robot 30. The rate of change of the height of ground may also be taken into account, so that the robot 30 may not detect a simple slope or a ramp as a curb 40. In the present technology and as discussed, a curbstone 40 may also be defined regarding its usefulness for climbing: a curb 40 may be defined as a straight line on the heightmap with length of at least the width of the robot 30 (so it could be climbed), both sides of which have a sufficiently flat area large enough to fit a robot 30 on it, and at the line, those flat areas have a height difference over a particular threshold (while it is noted that the flat areas do not necessarily need to be parallel to each other, they can slope at different angles).

This definition of a climbable curbstone may exclude all unclimbable curbs (e.g., a curved one, depending on the exact shape and the exact dimensions) and all curbs that can be climbed over without much effort by just driving over it, while it includes all features of the ground that were not designed as curbs but will function as such (the robot 30 can climb over it).

Figure 5A:
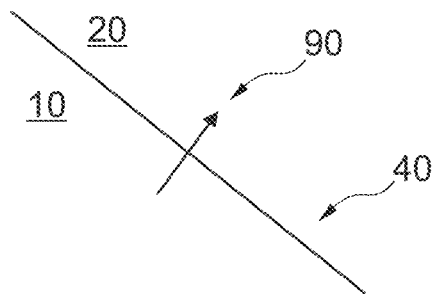
FIG. 5a depicts a schematic top view of two height levels.

As will be appreciated, to detect the curbstone 40 and its nature (e.g., dimensions and shape), the cross-sectional profile of the curbstone 40 may be of importance. This is illustrated exemplarily in FIGS. 5a to 5d. FIG. 5a very schematically illustrates the transition from a first level 10, which can be the street level, to a second level 20, which may be the level of the sidewalk. As discussed, these levels may correspond to the sections 62 and 64 in FIG. 3. The transition between the levels 10 and 20 are marked by a transition line or, more generally, by a transition section 40, which may be a curbstone. Of particular interest may be the profile of this transition section 40 along the direction orthogonal to this transition. This direction in indicated by arrow 90 in FIG. 5a. This direction generally corresponds to the direction with the steepest rate of change or to the direction along the gradient of the heightmap.

Figure 5B:
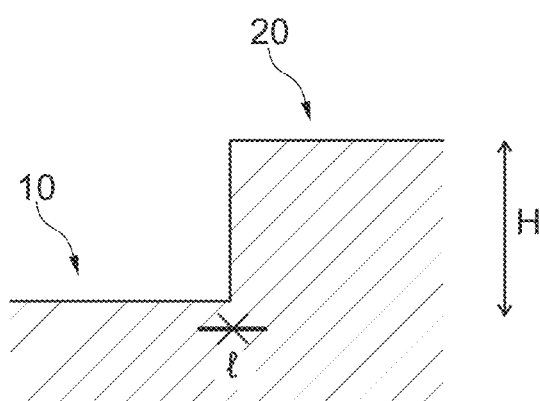
FIGS. 5b to 5d depict cross sectional views of a transition between different height levels.
Figure 5C:
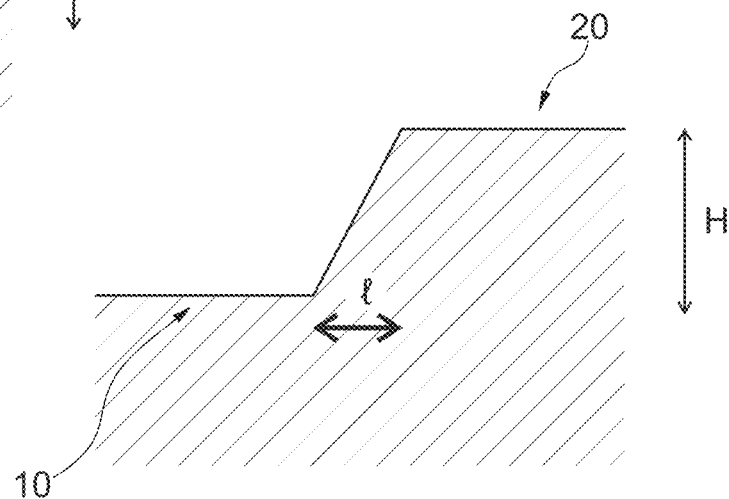
Figure 5D:
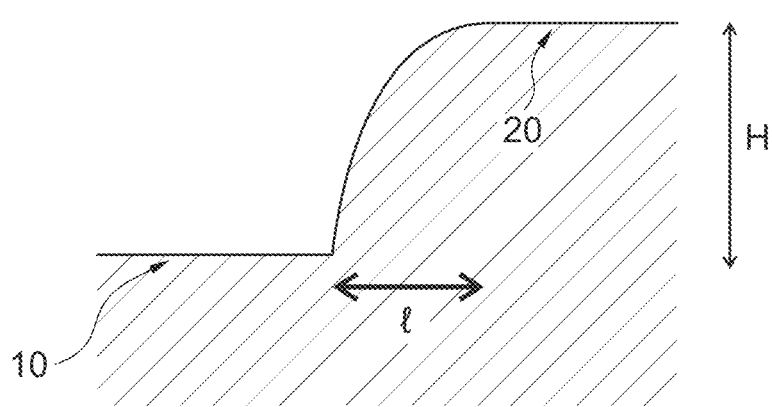

FIGS. 5b to 5d depict different possible curbstone profiles along the direction of arrow 50. FIG. 5b shows a curbstone having two rectangular or 90° edges to transition from the first level 10 to the second level 20. FIG. 5c depicts a "ramped" transition and FIG. 5d depicts a sloped transition.

The present technology detects the transition 40 and categorizes it. Thus, it may be decided how the robot reacts to the transition.

In that regard, the following steps may be performed in the present technology. The 3D camera 310 may capture images of the surroundings of the robot 30. This yields a 3D data set corresponding to a heightmap of the robot's surrounding. This data set may comprise x- and y-coordinates relating to the horizontal position and height h, which height h is dependent on the x- and y-coordinates, i.e. h=h(x, y).

The present technology analyzes the heightmap and may identify different levels. A level is a connected set in the 3D data set, where the height values lie on a plane, which plane may be horizontal or may be tilted with respect to the horizontal. It will be appreciated that there are no perfect planes in the real world, such that when reference to a plane is made herein, some deviations from a perfect plane are allowed. Put differently, a level is a connected set in the 3D data set, where the height values lie within a predefined range around a perfect plane.

Thus, one level or different levels may be determined. In particular, the present technology is concerned with the situation where more than one level is detected. In FIGS. 5a to 5d, there are always depicted two levels 10 and 20. As discussed, such levels 10, 20 may be detected by the present technology. As also discussed, the levels 10, 20 are separated by a transition section 40.

Measures which may be of importance for the present technology may be one or more of the following: Height difference H between the two levels 10, 20, length l of the transition from one level 10 to the other level 20 and the design of the transition (see FIGS. 5b to 5c).

Generally speaking, the greater the height difference H between the two levels 10, 20, the more difficult it is for the robot 30 to traverse from one level 10 to another level 20. The length l of the transition generally is the orthogonal length l of the transition, i.e., the horizontal length l along the gradient of the transition. Generally speaking, the shorter the length l of the transition, the more difficult it is for the robot 30 to traverse from one level 10 to another level 20. The 90° edge design corresponds to the transition length l being infinitesimally small. The design may also influence how difficult it is for the robot 30 to traverse from one level 10 to another 20.

Depending on the detected transition, the robot 30 may then select an appropriate traversing mechanism, as discussed above. That is, when the transition is relatively shallow (that is, it has a relatively small height H) and/or it is ramped or sloped (that is, the transition length l is relatively large), the robot 30 may, e.g., not alter its motion or simply accelerate. When, on the other hand, the transition is relatively high (that is, it has a relatively large height H) and/or it is very abrupt (that is, it has a very short length l and, in particular, the length is 0, close to 0 or even negative), the robot 30 may perform a more sophisticated climbing mechanism. A negative length l may occur, e.g., when there is a straight vertical curbstone and the road is curved such that the center of the road is higher than the sides of the road (e.g., for rain water to flow off the road). Because of this slope down towards the curbstone, when the robot is on the slope and considers the slope a level ground, the curbstone will appear as an overhang, i.e., as a transition having a negative length l.

Thus, the present technology provides a method and a robot not only for detecting obstacles, but for qualifying them and for determining further steps to be performed to traverse the obstacles, which further steps depend on the qualification of the obstacles. Thus, the present technology enables the robot to travel via an increased number of routes, thereby increasing the overall usability of the present technology.

In the foregoing, reference was made to climbing mechanisms, actions, or states of the robot 30. One example of such a climbing mechanism, action or state will now be described.

As discussed in conjunction with FIG. 2 above, the robot 30 may comprise an undercarriage or frame 302, particularly one that is arranged at the bottom of the robot 30. As can be seen in the depicted embodiment, 3 sets or pairs of wheels are provided, one or more front wheels 3042, one or more middle or center wheels 3044 and one or more rear wheels 3046 (also see FIGS. 6 and 7). The front wheels 3042 can be steered and can slightly protrude in front of the body 306. Also, other wheels may be steered. The wheels 3042, 3044, 3046 could also be covered by any kind of shields and/or can be integrated into the body 306.

Figure 6:
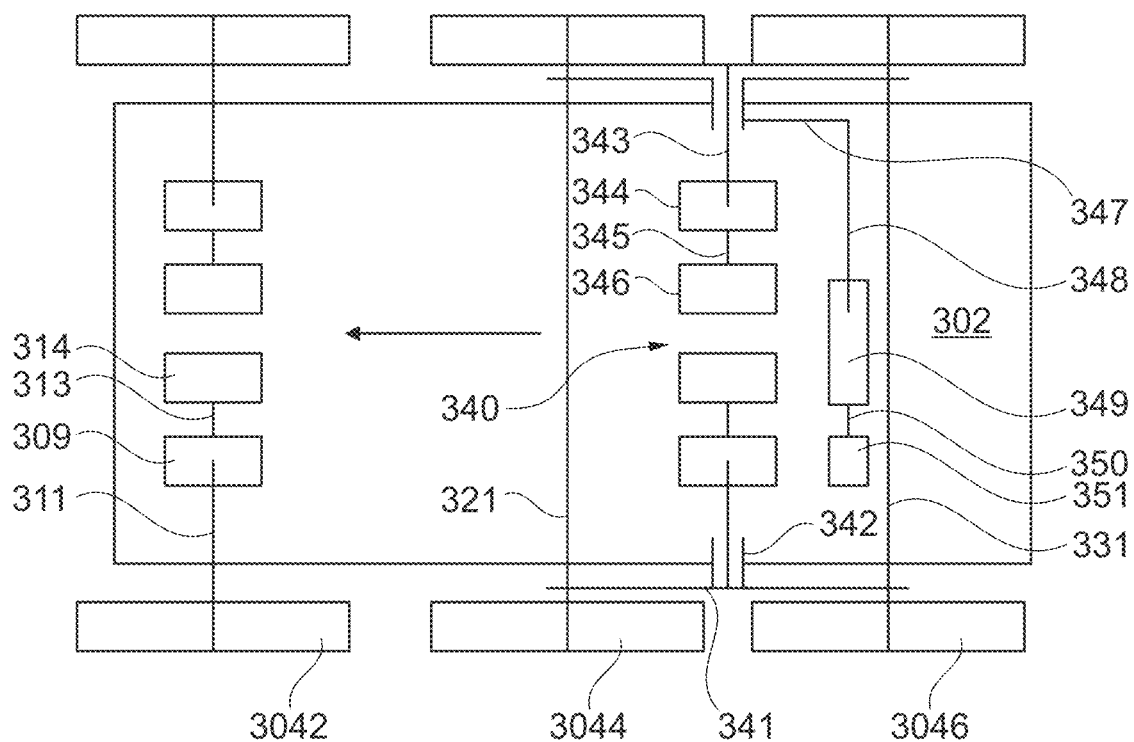
FIG. 6 depicts a schematic and exemplifying arrangement of elements of a climbing mechanism in a robot which may be employed for the present technology.

FIG. 6 shows a schematic sketch of parts of an exemplary robot. Reference numerals are provided for elements on one side only, in case further corresponding elements are provided on the other side. The front wheels 3042 can be driven and can extend over the front part of the body 306 and/or frame 302. A front motor 309 can drive a front axle 311 and the front wheel(s) 3042 being attached. Typically, the front wheels 3042 may rotate around a common axis of rotation, the front axis of rotation. As mentioned before, the front wheels 3042 can be steered (not shown). A front control 314 can control the front motor 309 and can also be connected to a central or intermediate robot control (not shown). The front wiring 313 can connect the front control 314 and the front motor 309. The same applies to the other side, i.e. to the other front wheel, front motor and front control (not numbered). A central motor driving both front wheels 3042 can also be provided, but requires more elements. The arrangement shown can thus be an easier, more reliable and less expensive design.

The middle wheels 3044 can be connected by a common middle axle 321 but could also be driven by individual axles (not shown). Independent of whether one or two axles are provided for the middle wheels 3044, they may rotate about a common axis of rotation, which may be called the middle or center axis of rotation.

The rear wheels 3046 can be connected by a common rear axle 331 but could also be driven by individual axles (not shown). Again, independent of the number of rear axles, they may rotate about a common axis of rotation, which may be called the back or rear axis of rotation.

In the described climbing mechanism, the front wheels, that is, the front axis of rotation may be moved out of and into the plane defined by the two other axes of rotation to facilitate the robot 30 climbing a curb stone 40.

An embodiment particularly for moving the middle wheels 3044 away from the body and/or frame 302 is shown for tilting the arrangement of middle wheels 3044 and rear wheels 3046. A tilting assembly 340 can do this. In the embodiment shown, the middle wheels 3044 and the rear wheels 3046 are driven together by rear motors 344. Alternatively, a common motor (not shown) could be arranged for driving all wheels in the middle and in the rear. The motors 344 drive a lever shaft 343 and the rotational movement and/or force will be further delivered to the middle wheels 3044 and rear wheels 3046 by a mechanism not shown. This mechanism could be any known means for transferring and/or gearing the rotational movement, such as by gear(s), pulley(s), chain(s) etc. or any combination thereof. Alternatively, the motors could also be located in the wheels or on the axles the wheels are directly connected to. This can apply to all wheels. A respective rear control 346 can control the rear motor 344 either individually on each side or one rear control 346 could also control the rear motors 344 together. The rear control 346 can also communicate with a central control (not shown).

A tilting lever or tilting shaft 341 or a unit working as a connection between the middle wheels 3044 and the rear wheels 3046 fixes these wheels in relation to each other. The tilting lever 341 can be turned and will allow the wheels 3044, 3046 to be driven and to tilt.

A tilting axle (lever bearing) 342 allows the arrangement of the middle wheels 3044 and rear wheels 3046 as well as the tilting lever 341 to turn. The tilting axle (lever bearing) 342 can be turned itself by a turning mechanism 347 for transferring and/or gearing a rotational movement, such as by gear(s), pulley(s), chain(s) etc. or any combination thereof. The rotational movement is provided, when needed, by a turning motor 349 driving a turning shaft 348 which will then make the tilting axle (lever bearing) 342 turn over the turning mechanism 347. A turning control 351 is connected with the turning motor 349 by a turning wiring 350. Again, the turning control 351 and turning wiring 350 may also communicate with a more central control (not shown).

The tilting assembly 340 can just be arranged on one side but also on both sides. In case it is arranged on one side, the middle wheels 3044 and the rear wheels 3046 can be connected by the axes 321 and 331, respectively.

Figure 7:
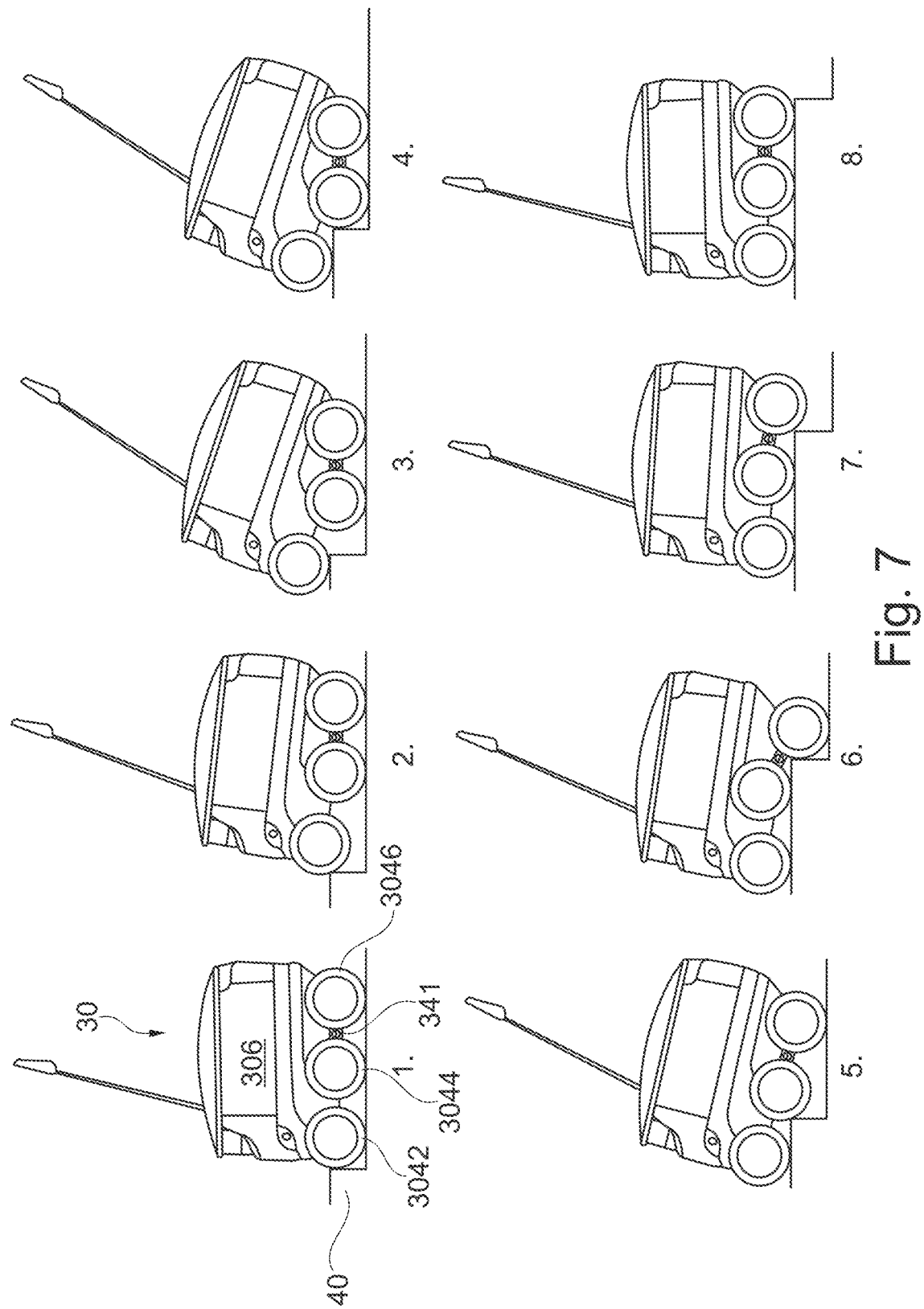
FIG. 7 depicts a process of a robot climbing a curbstone, which process may be employed by the present technology.

FIG. 7 shall exemplify different situations of climbing an obstacle, such as a curb stone 40, by the robot 30. For reasons of clarity, reference numbers are just shown in sketch no. 1. Middle wheels 3044 and rear wheels 3046 are both connected to a tilting lever 341. A curb stone 40 is shown being approached by the robot 30. The front wheels 3042 may touch the curb stone, also due to the front wheels 3042 protruding further than the frame 302 and/or the body 306. This can initiate the climbing of the robot 30 onto the curb stone 40, as shown in sketch no. 2. The traction of the front wheel onto the curb stone's vertical surface, the movement of the middle wheels away from the robot 30 generated by rotational movement of the tilting lever 341, the movement of the rear wheels 3046 towards the body 306 of the robot 30 and/or the forward momentum of the robot 30, aided by the force applied by the driven middle and/or rear wheels 3044, 3046 to keep the front wheels 3042 in contact with the curb stone vertical surface initiate the climbing of the robot 30 as shown. A motor for driving the tilting lever (not shown) can be turned on at this stage, so as to apply rotational force to the tilting lever 341 (to thereby tilt the front wheels' axis of rotation with regard to the plane defined by the middle and rear wheels' axes of rotation).

When the front wheels 3042 are on top of the curb stone 40, as shown in sketch no. 3, the middle wheels 3044 are further moved towards the curb stone 40 by the moving robot 30 until they touch the curb stone 40 as shown in sketch no. 4. During this phase, the tilting of the robot 30 is at its maximum, at least for the curb stone 40 shown. A further tilting may be possible when climbing a higher curb stone.

In sketch no. 5, the middle wheels 3044 are climbing up the curb stone 40 and the tilting action of the tilting mechanism is reversed, such that the middle wheels 3044 move towards the frame 302 of the robot 30, while the back wheels 3046 move towards the ground away from the robot 30, driven by the tilting lever 341. It will even reverse further as is apparent from sketch no. 6. By this action, maximum traction of all wheels and maximum stability of the robot 30 during climbing can be obtained.

During further progress of the robot 30, the tilting assembly will return back to a neutral position so that the wheels are in one plane or generally in one plane again. This is demonstrated in sketch no. 8. During such forward motion, the tilting mechanism is in a neutral position, and the motor driving the tilting mechanism is generally switched off. It is noted that the tilting lever may also be adapted to move freely until a certain angle is reached at which point the turning motor may engage. This may be useful, e.g., if the robot is moving over a bump in the sidewalk or the like—the motor does not have to be engaged, but the tilting lever simply moves freely.

It is not necessary to keep all wheels on the ground at all times, and this may even not be feasible when the robot 30 reaches an obstacle under another angle than the one shown in FIG. 7. However, the robot 30 may be designed and programmed to approach obstacles perpendicularly so that a stable and successful climbing of obstacles can be achieved.

Figure 8A:
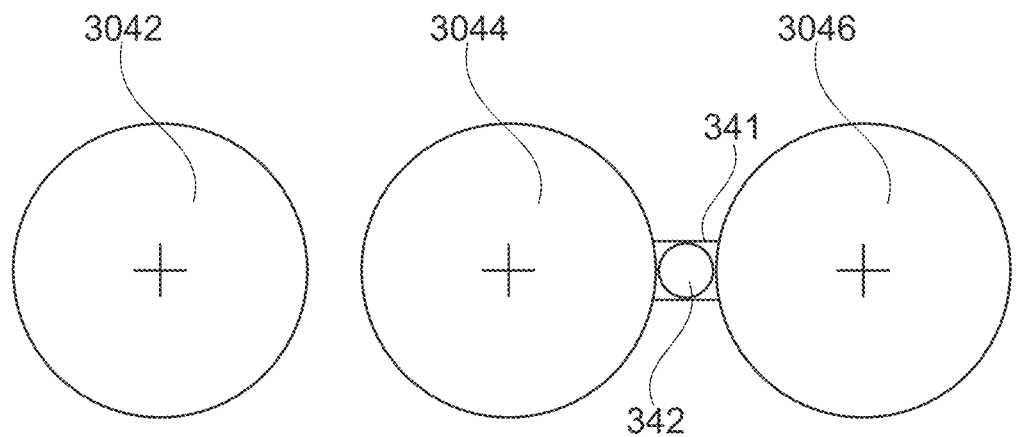
FIGS. 8a and 8b depict further details of the climbing mechanism depicted in FIG. 6.

FIG. 8 shows a side view of one embodiment of the wheels of the robot 30 wherein two back wheels are arranged on a tilting lever 341 that sits on a lever shaft (not shown). In FIG. 8a, the wheels 3042, 3044, 3046 are all horizontally or essentially horizontally aligned (with respect to the ground) on a straight line and the tilting lever 341 is aligned to or parallel to the frame of the robot (not shown). The tilting lever 341 is adapted to rotate around the lever bearing 342 so that the middle wheel 3044 and the back wheel 3046 move ascend or descend, depending on the direction of rotation. Thus, during clockwise rotation, the back wheel 3046 descends and the center wheel 3044 ascends, while during anticlockwise rotation the movement of the center and back wheels is reversed.

Figure 8B:
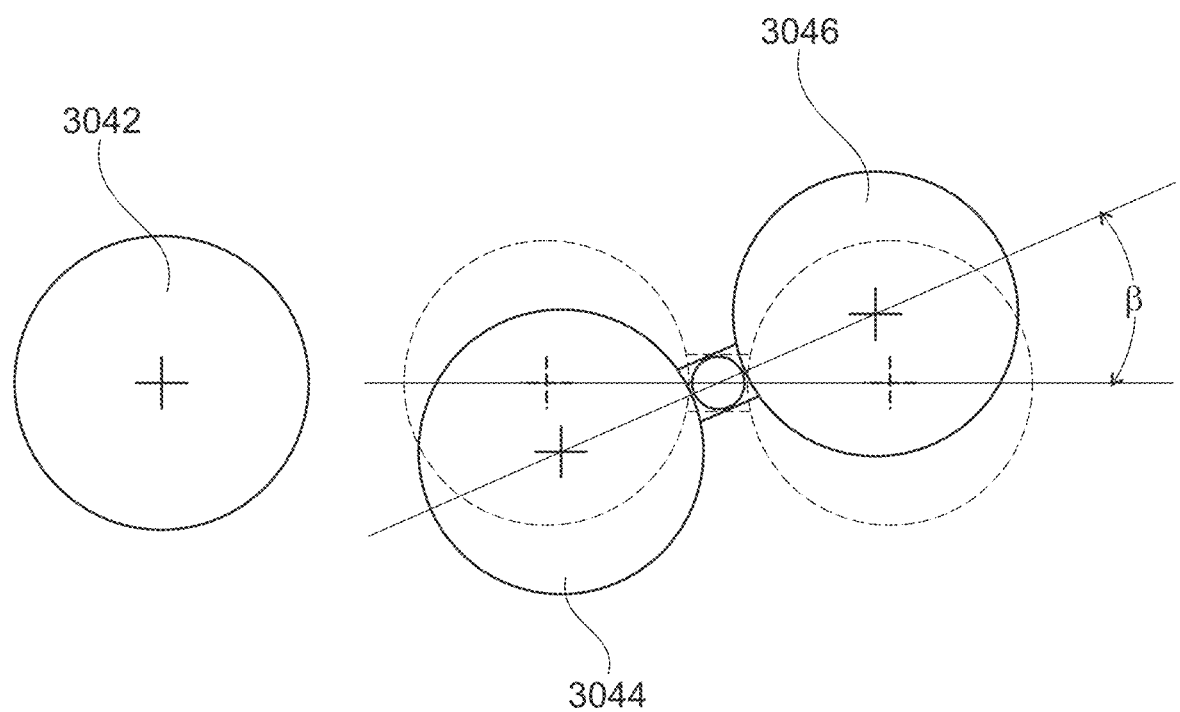

Thus, as shown in FIG. 8b, the tilting lever 341 can rotate by any given value of the angle β, where β=0 when the wheels are horizontally aligned. The tilting lever 341 can for example be adapted to rotate up to 60° in either direction around the lever bearing 342, resulting in an overall rotation of up to 120°. In other embodiments, the tilting lever 341 can rotate up to 50°, 40°, 30° or 20° in either direction.

While in the foregoing, one climbing mechanism for the robot 30 to climb an edged or 90° (that is, a vertical) curb stone 40 has been described with reference to FIGS. 6 to 8, the skilled person will understand that this climbing mechanism is merely exemplary and that other climbing mechanisms to climb such curb stones 40 (or, more generally:

transitions in height) may also be employed by the present technology. Such alternative climbing mechanisms may include, e.g., tracks.

Whenever a relative term, such as "about", "substantially" or "approximately" is used in this specification, such a term should also be construed to also include the exact term. That is, e.g., "substantially straight" should be construed to also include "(exactly) straight".

Whenever steps were recited in the above or also in the appended claims, it should be noted that the order in which the steps are recited in this text may be the preferred order, but it may not be mandatory to carry out the steps in the recited order. That is, unless otherwise specified or unless clear to the skilled person, the order in which steps are recited may not be mandatory. That is, when the present document states, e.g., that a method comprises steps (A) and (B), this does not necessarily mean that step (A) precedes step (B), but it is also possible that step (A) is performed (at least partly) simultaneously with step (B) or that step (B) precedes step (A). Furthermore, when a step (X) is said to precede another step (Z), this does not imply that there is no step between steps (X) and (Z). That is, step (X) preceding step (Z) encompasses the situation that step (X) is performed directly before step (Z), but also the situation that (X) is performed before one or more steps (Y1), . . . , followed by step (Z). Corresponding considerations apply when terms like "after" or "before" are used.

We claim:

1. A method of a robot responding to a transition between height levels, the method comprising:
   sensing information of surroundings of the robot and generating a three-dimensional data set corresponding to a heightmap of the surroundings of the robot based on the information;
   detecting a transition between different height levels in the three-dimensional data set;
   categorizing the transition between the different height levels using at least one characteristic; and
   the robot performing a response action based on the categorization of the transition,
   wherein the detecting of a transition between different height levels in the three-dimensional data set comprises:
   (A) allocating data points in the three-dimensional data set to different bins, depending on the height of the data points;
   (B) identifying two bins with the most data points;
   (C) selecting, on each of the two bins with the most data points, identified in (B), a respective first subset of data points from data points lying within a predetermined distance from the respective mean value of the data points within the respective bin;
   (D) generating a first estimation of said transition using a first classifier algorithm performed on the first subsets of data points; and
   (E) using the two bins identified in (B), refining the first estimation by:
      (E)(i) selecting, on each of the two bins with the most data points, identified in (B), a respective second subset of data points from data points lying within a predetermined distance from the first estimation; and
      (E)(ii) generating a second estimation of said transition using a second classifier algorithm performed on the second subsets of data points.

2. The method in accordance with claim 1,
   wherein sensing information uses a 3D stereo camera associated with the robot, and
   wherein said detecting a transition between different height levels in the three dimensional data set comprises:
   transforming the data set to a second three-dimensional data set, the second three-dimensional data set being defined by a horizontal dimension, a vertical dimension, and by a measure of disparity;
   detecting a transition between different height levels in the second three-dimensional data set; and
   transforming the transition to the three-dimensional data set.

3. The method in accordance with claim 2, wherein the detecting of a transition between different height levels comprises:
   calculating a gradient of the vertical dimension in the second three dimensional data set, and
   identifying values of the gradient exceeding a threshold as a transition between different height levels.

4. The method in accordance with claim 2, further comprising:
   linking transitions between different height levels in the second three dimensional data set into at least one continuous transition line.

5. The method in accordance with claim 1, wherein the response action comprises a traversing action to traverse the transition.

6. The method in accordance with claim 1, wherein the method further comprises:
   determining a height level on which the robot is travelling; and
   determining whether another height level on which the robot is not travelling has an area sufficient to support the robot.

7. The method in accordance with claim 1, wherein the detecting of a transition between different height levels in the three dimensional data set comprises:
   allocating data points in the three dimensional data set to different bins, depending on the height of the data points;
   identifying two bins with the most data points; and
   generating a boundary between the two bins with the most data points using a classifier algorithm, the boundary corresponding to the transition between different height levels.

8. The method in accordance with claim 7, wherein said generating a boundary between the two bins with the most data points using a classifier algorithm comprises:
   selecting first subsets of the data points of the two bins with the most data points;
   generating a first boundary using a first classifier algorithm performed on the first subsets;
   selecting second subsets of data points of the two bins with the most data points; and
   generating a second boundary using a second classifier algorithm performed on the second subsets.

9. The method in accordance with claim 8, wherein the respective first subsets of data points of the two bins with the most data points are selected from data points lying within a predetermined distance from the respective mean value of the data points within the respective bin.

10. The method in accordance with claim 8, wherein the second subsets of data points of the two bins with the most data points are selected from data points lying within a predetermined distance from the first boundary.

11. The method in accordance with claim 1, wherein detecting a transition between different height levels in the three-dimensional data set comprises executing
- a first iteration wherein a first classifier is run on a first subset of data points of the three-dimensional data set to generate a boundary corresponding to the transition between different height levels and
- a second iteration wherein a second classifier is run on a second subset of data points of the three-dimensional data set selected from data points separated from the boundary by no more than a predetermined distance to refine the boundary.

12. A system comprising:
a robot adapted to travel,
a sensor adapted to sense information of surroundings of the robot, and
at least one processor configured to:
generate a three-dimensional data set corresponding to a heightmap of the surroundings of the robot based on the information of surroundings of the robot,
detect a transition between different height levels in the three-dimensional data set, and
categorize the transition between the different height levels using at least one characteristic,
  wherein the robot is adapted to perform at least one response action, which response action depends on a categorization of the transition,
wherein the at least one processor is configured to detect a transition between different height levels in the three-dimensional data set by:
(A) allocating data points in the three-dimensional data set to different bins, depending on the height of the data points;
(B) identifying two bins with the most data points; and
(C) selecting, on each of the two bins with the most data points, identified in (B), a respective first subset of data points from data points lying within a predetermined distance from the respective mean value of the data points within the respective bin;
(D) generating a first estimation of said transition using a first classifier algorithm performed on the first subsets of data points; and
(E) using the two bins identified in (B), refining the first estimation by:
  (E)(i) selecting, on each of the two bins with the most data points, identified in (B), a respective second subset of data points from data points lying within a predetermined distance from the first estimation; and
  (E)(ii) generating a second estimation of said transition using a second classifier algorithm performed on the second subsets of data points.

13. The system in accordance with claim 12, wherein the sensor comprises a 3D stereo camera, and
wherein the three dimensions of the data set correspond to three spatial dimensions, and
wherein the at least one processor is configured to:
transform the data set to a second three dimensional data set, the second three dimensional data set being defined by a horizontal dimension, a vertical dimension, and a measure of disparity,
detect a transition between different height levels in the second three-dimensional data set, and
transform the transition to the three dimensional data set.

14. The system in accordance with claim 13, wherein the at least one processor is configured such that detecting a transition between different height levels comprises calculating a gradient of the vertical dimension in the second three-dimensional data set and identifying values of the gradient exceeding a threshold as a transition between different height levels.

15. The system in accordance with claim 12, wherein the at least one processor is further configured to:
determine a height level on which the robot is travelling, and
determine whether another height level on which the robot is not travelling has an area sufficient to support the robot.

16. The system in accordance with claim 12, wherein the at least one processor is configured to:
allocate data points in the three dimensional data set to different bins, depending on the height of the data points,
identify two bins with the most data points, and
generate a boundary between the two bins with the most data points using a classifier algorithm, the boundary corresponding to the transition between different height levels.

17. The system in accordance with claim 16, wherein the at least one processor is configured such that generating a straight dividing line between the two bins with the most data points using a linear classifier algorithm comprises:
selecting first subsets of the data points of the two bins with the most data points;
generating a first boundary using a first classifier algorithm performed on the first subsets;
selecting second subsets of data points of the two bins with the most data points; and
generating a second boundary using a second classifier algorithm performed on the second subsets.

18. The system in accordance with claim 17, wherein the at least one processor is configured to select the respective first subsets of data points of the two bins with the most data points from data points lying within a predetermined distance from the respective mean value of the data points within the respective bin.

19. A data processing system adapted to detect a transition between different height levels in a three-dimensional data set, the data processing system comprising at least one processor, wherein the data processing system is configured to:
(a) allocate data points in the three-dimensional data set to different bins, depending on the height of the data points;
(b) identify two bins with the most data points; and
(c) select, on each of the two bins with the most data points, identified in (b), a respective first subset of data points from data points lying within a predetermined distance from the respective mean value of the data points within the respective bin, and
(d) generate a first estimation of said transition using a first classifier algorithm performed on the first subsets of data points, and
(e) using the two bins identified in (b), refine the first estimation by:
  (e)(i) selecting, on each of the two bins with the most data points, identified in (b), a respective second subset of data points from data points lying within a predetermined distance from the first estimation; and
  (e)(ii) generating a second estimation of said transition using a second classifier algorithm performed on the second subsets of data points.

20. The system in accordance with claim 12, wherein the at least one processor is configured to execute a first iteration wherein a first classifier is run on a first subset of data points of the three-dimensional data set to generate a boundary corresponding to the transition between different height levels, and a second iteration wherein a second classifier is run on a second subset of data points of the three-dimensional data set selected from data points separated from the boundary by no more than a predetermined distance to refine the boundary.

21. The system in accordance with claim 17, wherein the at least one processor is configured to select the respective second subsets of data points of the two bins with the most data points from data points lying within a predetermined distance from the first boundary.

22. The data processing system in accordance with claim 19, wherein the classifier algorithm comprises a linear classifier algorithm.

23. The data processing system of claim 22, wherein the classifier algorithm comprises a support vector machine algorithm.

24. The data processing system in accordance with claim 19, wherein the first classifier algorithm and the second classifier algorithm are linear classifier algorithms.

25. The data processing system of claim 24, wherein the first classifier algorithm and the second classifier algorithm are support vector machine algorithms.

\* \* \* \* \*